United States Patent
Yamazaki

(10) Patent No.: US 9,286,107 B2
(45) Date of Patent: Mar. 15, 2016

(54) INFORMATION PROCESSING SYSTEM FOR SCHEDULING JOBS, JOB MANAGEMENT APPARATUS FOR SCHEDULING JOBS, PROGRAM FOR SCHEDULING JOBS, AND METHOD FOR SCHEDULING JOBS

(71) Applicant: FUJITSU LIMITED, Kawasaki-shi, Kanagawa (JP)

(72) Inventor: Fumio Yamazaki, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/449,188

(22) Filed: Aug. 1, 2014

(65) Prior Publication Data

US 2015/0067693 A1    Mar. 5, 2015

(30) Foreign Application Priority Data

Aug. 30, 2013  (JP) ................ 2013-179088

(51) Int. Cl.
*G06F 9/46* (2006.01)
*G06F 9/48* (2006.01)

(52) U.S. Cl.
CPC ............... *G06F 9/46* (2013.01); *G06F 9/4893* (2013.01)

(58) Field of Classification Search
USPC ........................................... 718/1, 100–107
IPC ................. G06F 9/46,9/4893, 9/4848
See application file for complete search history.

(56) References Cited

U.S. PATENT DOCUMENTS

| | | | | |
|---|---|---|---|---|
| 6,763,519 B1 * | 7/2004 | McColl | ................ | G06F 9/5044 709/202 |
| 7,444,637 B2 * | 10/2008 | Pronovost | ............ | G06F 9/4881 711/151 |
| 7,712,100 B2 * | 5/2010 | Fellenstein | ............ | G06Q 40/04 705/37 |
| 7,937,705 B1 * | 5/2011 | Prael | ..................... | G06F 9/5072 709/201 |
| 8,020,186 B1 * | 9/2011 | Sie | .......................... | H04N 5/76 725/101 |

(Continued)

FOREIGN PATENT DOCUMENTS

| | | |
|---|---|---|
| JP | 2005-285123 | 10/2005 |
| JP | 2007-334497 | 12/2007 |
| JP | 2008-257578 | 10/2008 |
| JP | 2012-073690 | 4/2012 |

OTHER PUBLICATIONS

Goossens et al, "Job Partitioning Strategies for Multiprocessor Scheduling of Real-Time Periodic Tasks with Restricted Migrations" ACM, pp. 1-10, 2012.*

(Continued)

*Primary Examiner* — Anil Khatri
(74) *Attorney, Agent, or Firm* — Fujitsu Patent Center

(57) ABSTRACT

A job management apparatus includes a storage device configured to store a maximum power value when one or more calculation nodes has executed a first job, and a controller configured to detect the first job, at least one of which an identification information is matched with the identification information of a second job to be scheduled, of which the number of the calculation nodes to use is matched with the number of the calculation nodes of the second job, and of which a difference of the number of the calculation nodes with the second job is within a prescribed range, predict, as a second maximum power value of the second job, a first maximum power value of the detected first job, and schedule the second job such that the second maximum power value of the second job does not exceed a power consumption limit value set according to a time.

16 Claims, 19 Drawing Sheets

(56) References Cited

U.S. PATENT DOCUMENTS

| | | | | |
|---|---|---|---|---|
| 8,185,908 B2* | 5/2012 | Taniguchi | ............. | G06F 9/5038 709/221 |
| 8,291,421 B2* | 10/2012 | Oswald | ................ | G06F 9/4881 712/214 |
| 8,418,186 B2* | 4/2013 | Jackson | .................... | G06F 9/50 709/223 |
| 8,434,084 B2* | 4/2013 | Ferdous | ................ | G06F 9/5044 709/203 |
| 8,640,137 B1* | 1/2014 | Bostic | ................... | G06F 9/5072 718/101 |
| 8,689,220 B2* | 4/2014 | Prabhakar | ............. | G06F 9/4893 703/13 |
| 8,700,929 B1* | 4/2014 | Weber | ................... | G06F 1/3206 713/300 |
| 8,875,142 B2* | 10/2014 | Shivanna | ............. | G06F 9/4881 714/1 |
| 2008/0250260 A1 | 10/2008 | Tomita | | |
| 2012/0266174 A1 | 10/2012 | Inoue | | |

OTHER PUBLICATIONS

Rong et al, "Power-Aware Scheduling and Dynamic Voltage Setting for Tasks Running on a Hard Real-Time System", IEEE, pp. 473-478, 2006.*

Kim et al, "Integrating Real-Time Hybrid Task Scheduling into a Senor Node Platform", ACM, pp. 737-741, 2010.*

Tak et al, "Performance Study of Real-time Scheduling Schemes in Configurable Component-based Sensor Node Platforms", ACM, pp. 1-8, 2014.*

Ravi et al, "Scheduling Concurrent Applications on a Cluster of CPU-GPU Nodes", IEEE, pp. 140-147, 2012.*

Gotoda et al, "Task scheduling algorithm for multicore processor system for minimizing recovery time in case of single node fault", IEEE, pp. 260-267, 2012.*

Moreira et al, "Scheduling Multiple Independent Hard-Real-Time Jobs on a Heterogeneous Multiprocessor", ACm, pp. 57-66, 2007.*

* cited by examiner

FIG. 4A

| REGISTRATION INFORMATION | CONTENT |
|---|---|
| JOB IDENTIFICATION INFORMATION | JOB NAME |
| JOB TYPE | SEQUENTIAL JOB, PARALLEL JOB |
| THE NUMBER OF USED CALCULATION NODES | THE NUMBER OF CALCULATION NODES USED TO EXECUTE JOB |
| THE NUMBER OF PROCESSES | THE NUMBER OF PROCESSES GENERATED WHEN JOB IS EXECUTED |
| ESTIMATED I/O AMOUNT | ESTIMATED I/O AMOUNT TO FILE SYSTEM |
| ESTIMATED EXECUTION TIME | ESTIMATED EXECUTION TIME OF JOB |

| JOB IDENTIFICATION INFORMATION | JOB TYPE | THE NUMBER OF USED CALCULATION NUMBERS | THE NUMBER OF PROCESSES | ESTIMATED I/O AMOUNT | ESTIMATED EXECUTION TIME (h) |
|---|---|---|---|---|---|
| JOB A (ja) | SEQUENTIAL JOB | 8 | 16 | 30 | 5 |
| JOB B (jb) | SEQUENTIAL JOB | 3 | 15 | 20 | 4 |
| ... | ... | ... | ... | ... | ... |

| JOB IDENTIFICATION INFORMATION | THE NUMBER OF USED CALCULATION NODES | ESTIMATED EXECUTION TIME (h) | ESTIMATED MAXIMUM POWER CONSUMPTION VALUE (kW) |
|---|---|---|---|
| JOB A (ja) | 8 | 5 | 20 |
| JOB B (jb) | 3 | 4 | 10 |
| JOB C (jc) | 20 | 10 | 50 |
| JOB D (jd) | 12 | 1 | 40 |
| JOB E (je) | 32 | 6 | 100 |

FIG. 14

| TIME BLOCK | POWER CONSUMPTION LIMIT VALUE (kW) | |
| --- | --- | --- |
| | WEEKDAYS | SATURDAYS/SUNDAYS |
| 0:00 — 6:59 | 100 | 100 |
| 7:00 — 10:59 | 80 | 90 |
| 11:00 — 14:59 | 60 | 80 |
| 15:00 — 18:59 | 80 | 90 |
| 19:00 — 23:59 | 100 | 100 |

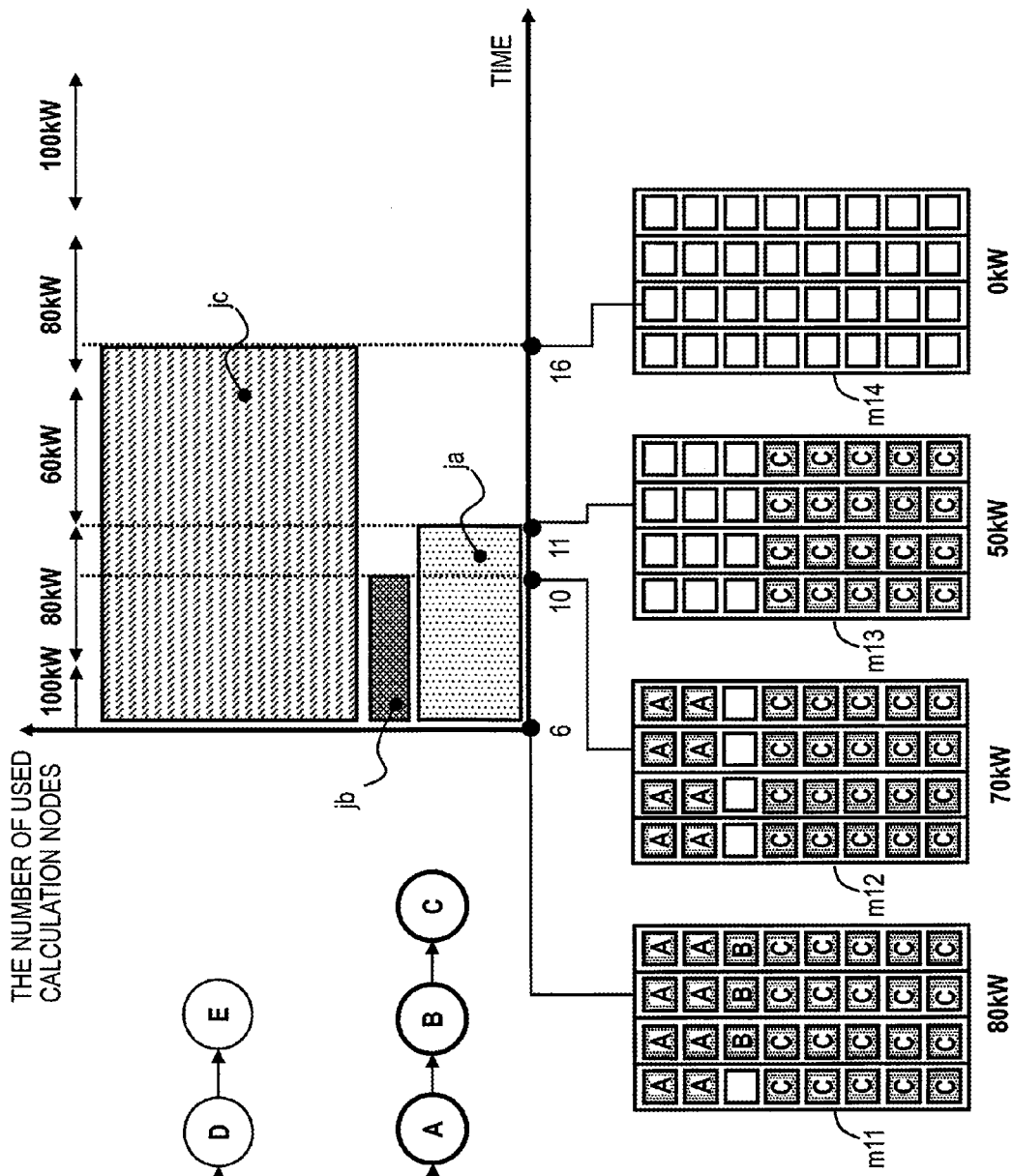

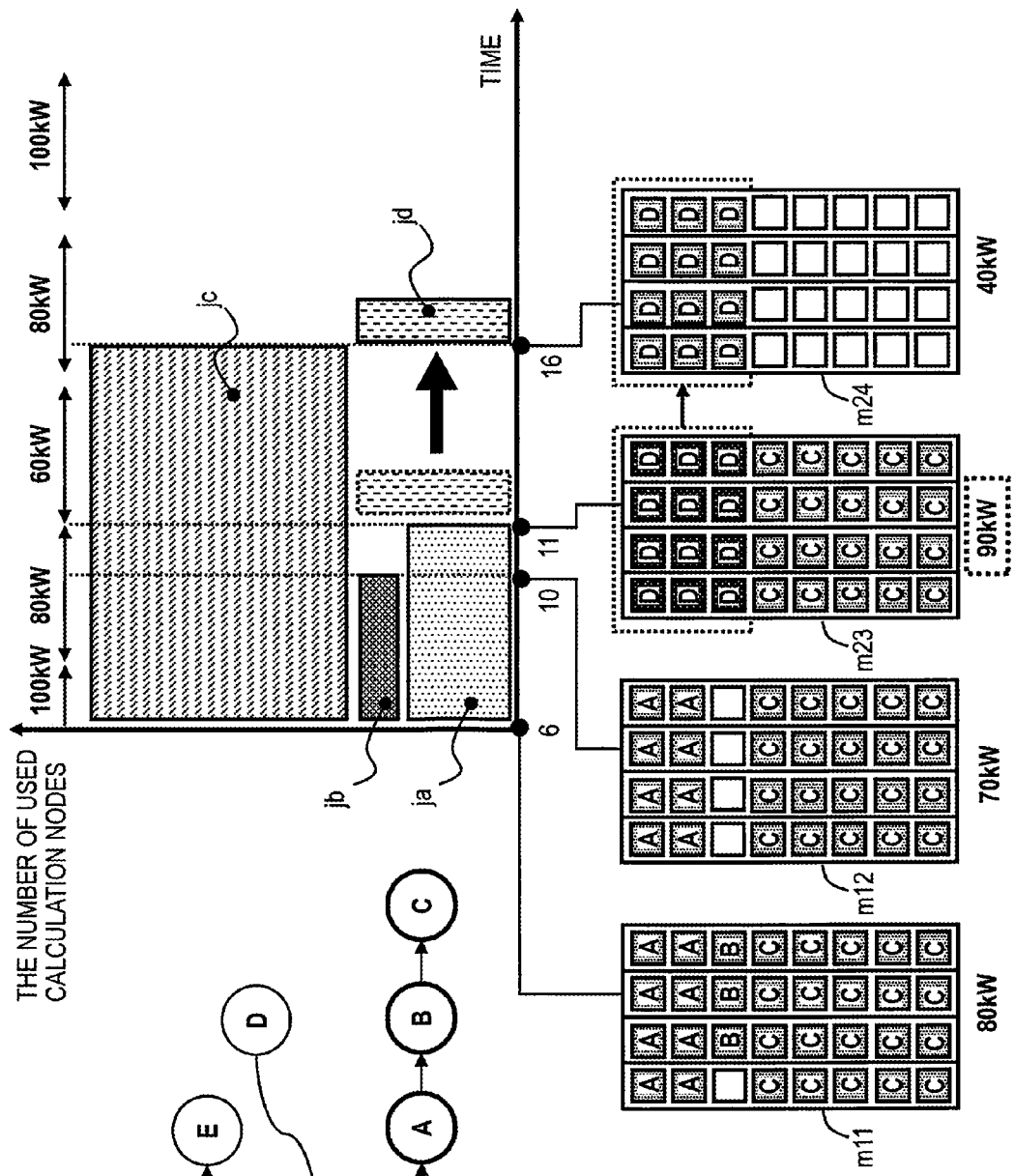

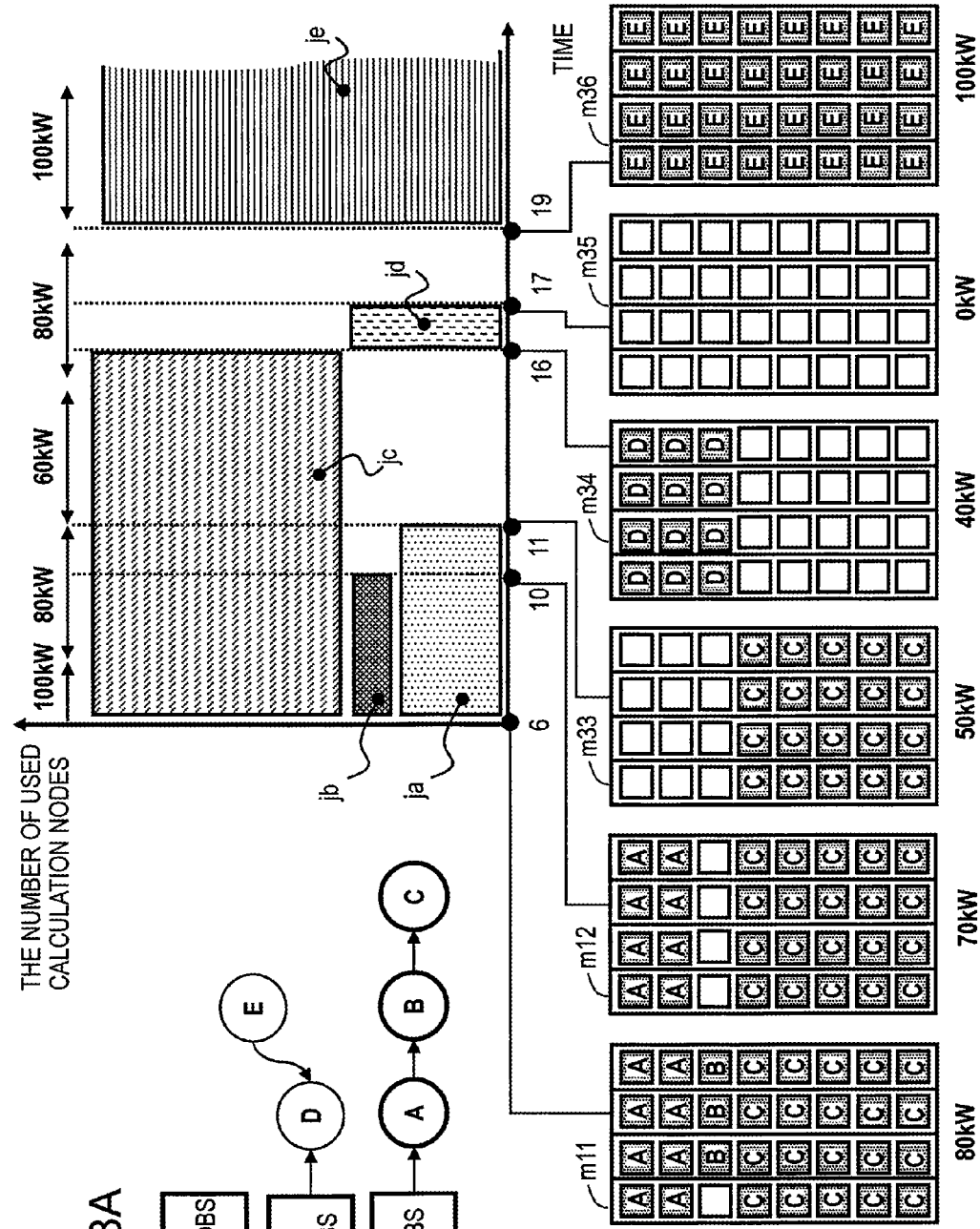

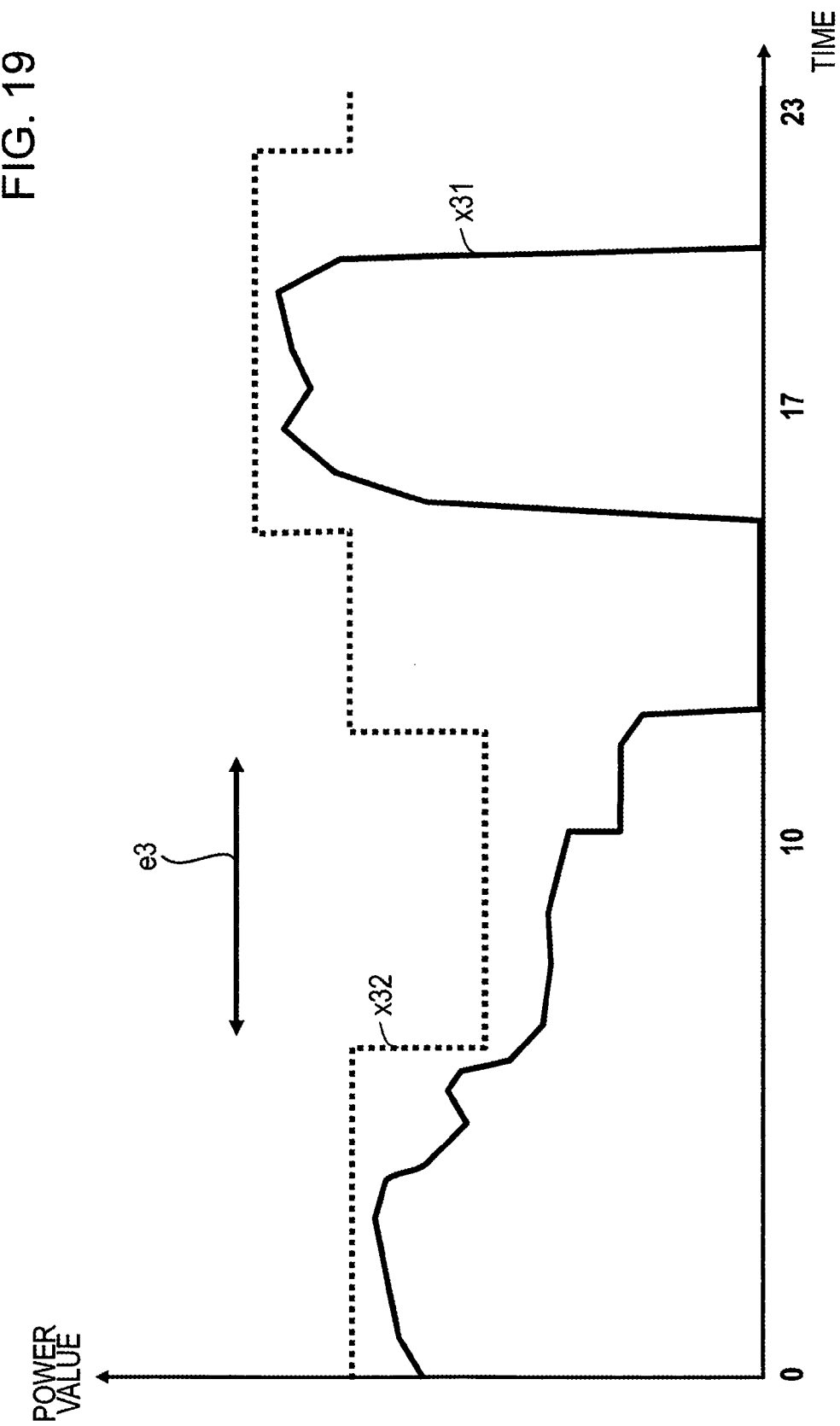

INFORMATION PROCESSING SYSTEM FOR SCHEDULING JOBS, JOB MANAGEMENT APPARATUS FOR SCHEDULING JOBS, PROGRAM FOR SCHEDULING JOBS, AND METHOD FOR SCHEDULING JOBS

CROSS-REFERENCE TO RELATED APPLICATION

This application is based upon and claims the benefit of priority of the prior Japanese Patent Application No. 2013-179088, filed on Aug. 30, 2013, the entire contents of which are incorporated herein by reference.

FIELD

The embodiment discussed herein is related to an information processing system, a job management apparatus, a non-transitory computer-readable recording medium, and a method.

BACKGROUND

In recent years, large-scale computer systems such as supercomputers have managed and executed a greater amount of jobs than ever before. Such computer systems include, for example, a management node and a plurality of calculation nodes. The management node generates, for example, the schedules of jobs and instructs each of the calculation nodes to execute the jobs. After receiving the instruction, each of the calculation nodes executes the jobs (for example, Japanese Patent Application Laid-open No. 2012-73690).

Meanwhile, with a reduction in power supply caused by the effects of the Great East Japan Earthquake on March 2011, limitation on the use of power based on Article 27 of Electricity Business Act has been imposed on major consumers. Accordingly, for example, in a summer-time time block in which power demand grows, a 15% reduction in power consumption has been implemented. Separately from the limitation on the use of the power based on the law, the major consumers have reduced power consumption amounts within jurisdictions by, for example, stopping systems for each time.

When consideration is given to a reduction in power consumption amount, one approach is to reduce a total power consumption amount from the viewpoint of environmental protection and the other approach is to reduce instantaneous maximum power consumption within its limited range so as to correspond to a reduction in supply amount. As the former approach, computer systems and control systems for realizing low power consumption are discussed. As the latter approach, for example, operations considering maximum power consumption are demanded by large-scale computer systems. For example, by the manual interruption control of the power supply of some of hardware devices (such as calculation nodes and peripheral devices) in systems, limitation on the maximum power consumption of the large-scale computer systems is implemented.

Patent Literature 1: Japanese Patent Application Laid-open No. 2012-73690

SUMMARY

However, the limitation on the maximum power consumption by the interruption control of the power supply of some of the hardware devices is based on a rough estimate, whereby the differences between maximum power consumption limit values and the power consumption values of the computer systems are likely to become large. In addition, since calculation resources become insufficient with the disablement of some of the hardware devices, inexecutable jobs may be caused. As described above, it has been difficult to efficiently execute jobs while reducing maximum power consumption to its limit value. Moreover, processing for controlling the interruption of the power supply of the hardware devices may require personal costs.

According to a first aspect of the embodiment, an information processing system includes, a plurality of calculation nodes that execute jobs; and a job management node that manages the jobs, wherein the job management apparatus includes, a storage device configured to store a maximum power value when one or more calculation nodes has executed a first job, and a controller configured to detect the first job, at least one of which an identification information is matched with the identification information of a second job to be scheduled, of which the number of the calculation nodes to use is matched with the number of the calculation nodes of the second job, and of which a difference of the number of the calculation nodes with the second job is within a prescribed range, predict, as a second maximum power value of the second job, a first maximum power value of the detected first job stored in the storage device, and schedule the second job such that the second maximum power value of the second job does not exceed a power consumption limit value set according to a time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B are diagrams illustrating an example of the registration information of jobs.

FIG. 5 is a diagram illustrating an example of jobs to be scheduled according to the embodiment.

FIG. 14 is a diagram illustrating a change in the power consumption limit value in the specific example.

FIGS. 16A and 16B are first diagrams illustrating the schedule processing.

FIGS. 17A and 17B are second diagrams illustrating the schedule processing.

FIGS. 18A and 18B are third diagrams illustrating the schedule processing.

FIG. 19 is a diagram illustrating a power consumption limit value x32 and a power consumption value x31 in a case in which the job management processing according to the embodiment is performed.

DESCRIPTION OF EMBODIMENTS

Information Processing System

Figure 1:
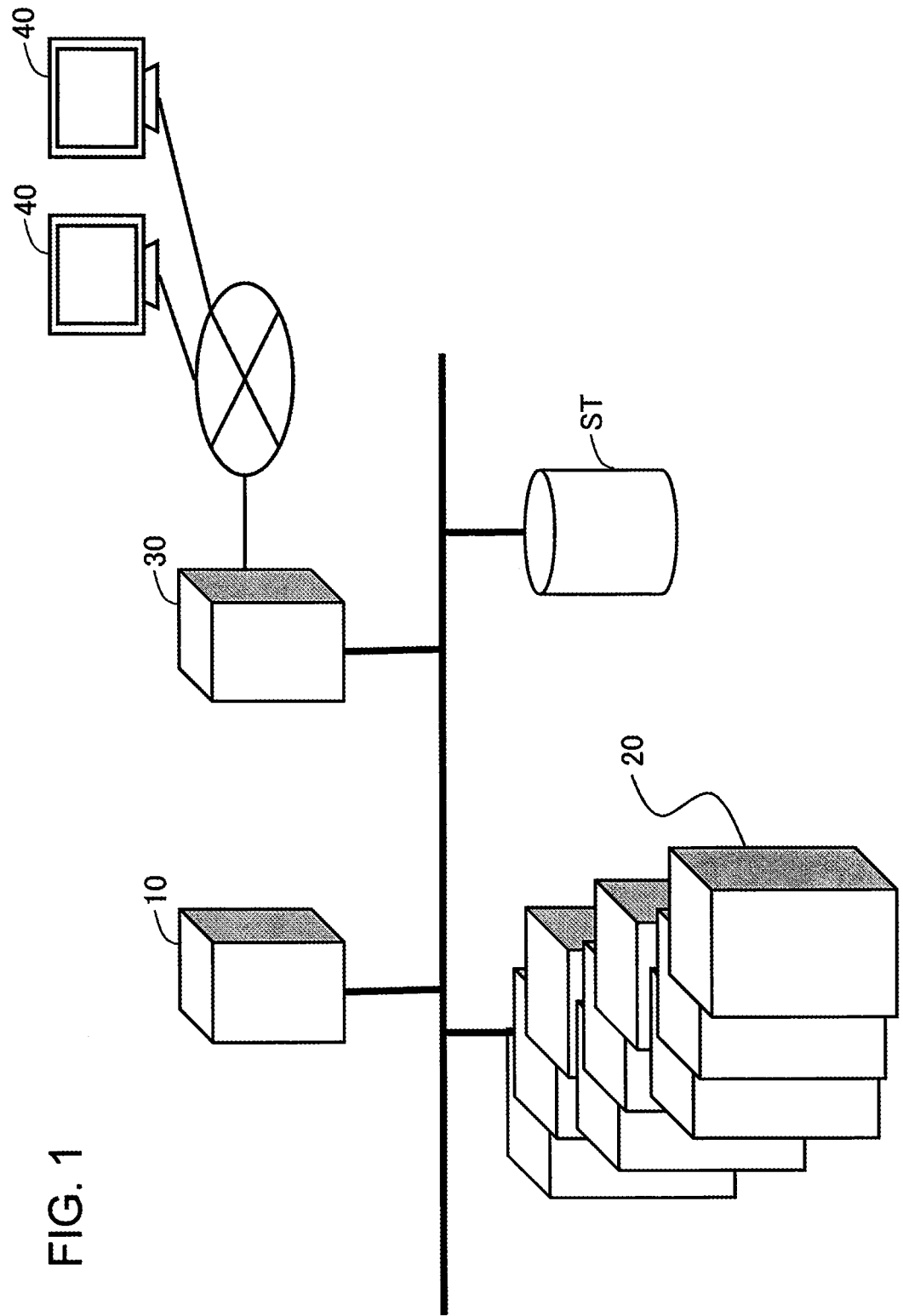
FIG. 1 is a diagram illustrating the configuration of an information processing system according to an embodiment.

FIG. 1 is a diagram illustrating the configuration of an information processing system according to an embodiment. The information processing system according to the embodiment has, for example, a job management node 10, a plurality of calculation nodes 20, a login node 30, and a storage ST. The job management node 10 is connected to the plurality of calculation nodes 20 and the login node 30. The login node 30 receives the registration of a job to be executed from, for example, a user's terminal apparatus 40 connected via the Internet. The job management node 10 acquires the information of the registered job from the login node 30 and generates the schedule of the job. In addition, the job management node 10 reads the program, the input information, or the like of the job from the storage ST based on the generated schedule and instructs the calculation nodes 20 to execute the job. Each of the calculation nodes 20 executes the job based on the instruction from the job management node 10.

(Configuration of Job Management Node 10)

Figure 2:
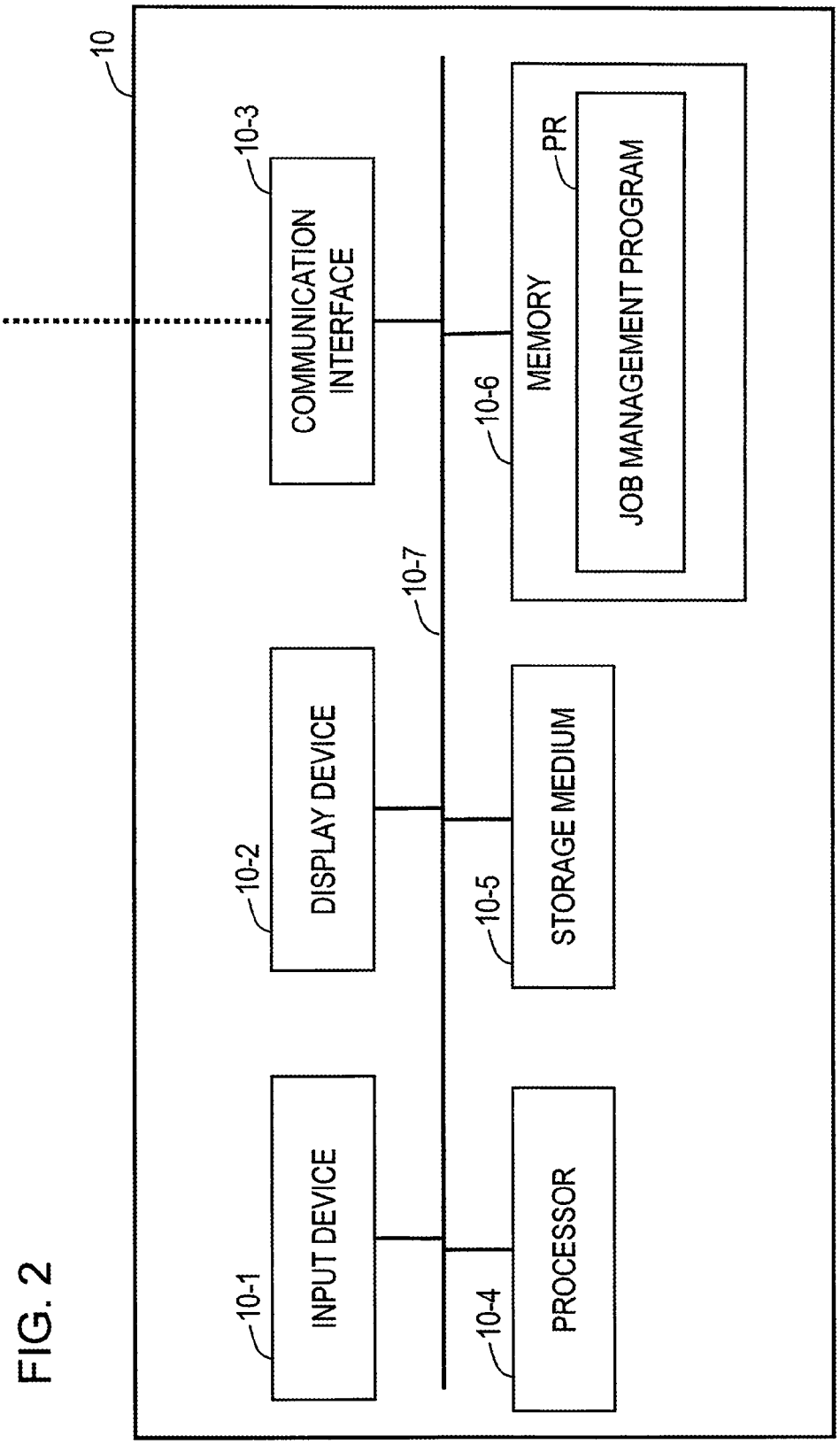
FIG. 2 is a diagram illustrating an example of the configuration of the job management node 10 in the information processing system of FIG. 1.

FIG. 2 is a diagram illustrating an example of the configuration of the job management node 10 in the information processing system of FIG. 1. The job management node 10 of FIG. 2 has, for example, an input device 10-1, a display device 10-2, a communication interface 10-3, a processor 10-4, a storage medium 10-5, and a memory 10-6. The respective devices are connected to one another via a bus 10-7. The input device 10-1 represents, for example, a keyboard and a mouse, and the display device 10-2 represents, for example, a display screen such as a display. In addition, the job management node 10 communicates with the plurality of calculation nodes 20 and the login node 30 via the communication interface 10-3. The memory 10-6 stores a job management program PR according to the embodiment. The job management program PR implements job management processing according to the embodiment in cooperation with the processor 10-4.

(Block Diagram of Job Management Node 10)

Figure 3:
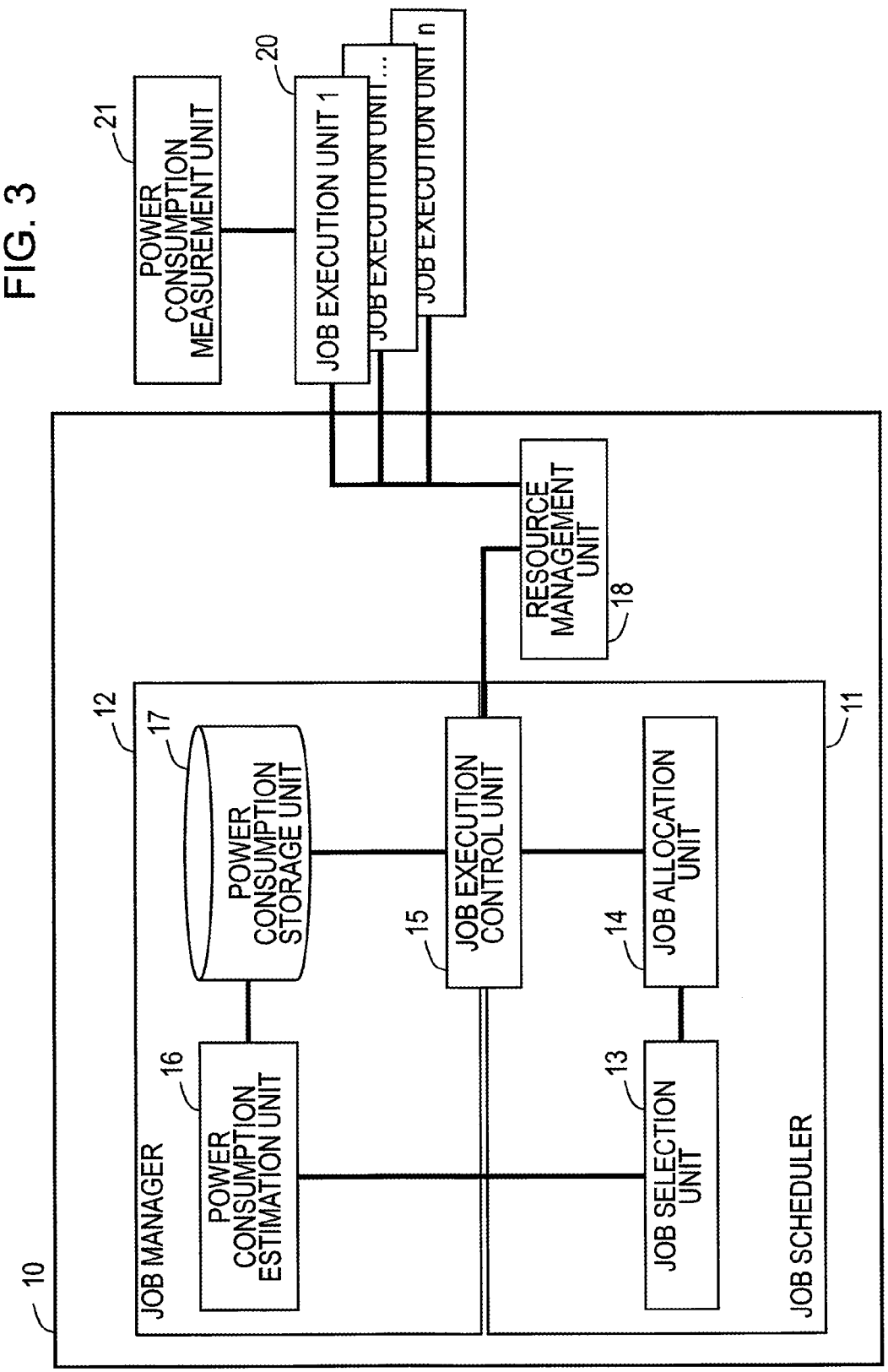
FIG. 3 is a diagram illustrating an example of the block diagram of the job management node 10 according to the embodiment.

FIG. 3 is a diagram illustrating an example of the block diagram of the job management node 10 according to the embodiment. The job management node 10 according to the embodiment has, for example, a job manager 12, a job scheduler 11, and a resource management unit 18. For example, the job scheduler 11 manages jobs and generates the schedules of the jobs. The job scheduler 11 has, for example, a job selection unit 13, a job allocation unit 14, and a job execution control unit 15.

The job selection unit 13 of the job scheduler 11 selects jobs in order of priority from among a plurality of jobs to be scheduled and outputs the information of the jobs to the job allocation unit 14. The information of the jobs will be described later. In addition, the job selection unit 13 outputs the information of the selected jobs to the job manager 12 and acquires the estimated values of the maximum power consumption (hereinafter referred to as the estimated maximum power consumption values) of the jobs. The maximum power consumption of the jobs represents the maximum value of power consumed to execute the jobs. Note that the estimated maximum power consumption values thus acquired are also output to the job allocation unit 14.

The job allocation unit 14 generates the schedules of the jobs based on the information output from the job selection unit 13. Specifically, the job allocation unit 14 makes the schedules by allocating the jobs to time blocks in which the number of the calculation nodes 20 to be used by the jobs (hereinafter referred to as the number of the used calculation nodes) is securable and which correspond to estimated times for executing the jobs (hereinafter referred to as the estimated execution times). In addition, according to the embodiment, the job allocation unit 14 makes the schedules such that the sum of the estimated maximum power consumption values of the jobs does not exceed a power consumption limit value. The power consumption limit value is set according to time of day.

Based on the schedules generated by the job allocation unit 14, the job execution control unit 15 transfers the jobs having reached their execution start time to the job execution units (the calculation nodes) 20 corresponding to the calculation nodes to be used by the jobs via the resource management unit 18. In addition, each of the job execution units 20 is connected to a power consumption measurement unit 21 and acquires the current power consumption values of the jobs measured by the power consumption measurement unit 21. Moreover, the respective job execution units 20 output, when the jobs end, the maximum power consumption values of the jobs to the job execution control unit 15. The job execution control unit 15 stores the maximum power consumption values of the jobs in the power consumption storage unit 17 (the storage medium 10-5 of FIG. 2) of the job manager 12.

Further, the job manager 12 of FIG. 3 manages, for example, the job scheduler 11 and the power consumption values of the jobs. The job manager 12 has, for example, the job execution control unit 15, a power consumption estimation unit 16, and the power consumption storage unit 17.

The power consumption storage unit 17 stores the information of the respective executed jobs. Specifically, the power consumption storage unit 17 stores, for example, the number of the calculation nodes used by the executed jobs, the execution times of the executed jobs, and the maximum power consumption values of the calculation nodes 20 having executed the jobs. The power consumption estimation unit 16 refers to the power consumption storage unit 17 and acquires the estimated maximum power consumption values of the jobs based on the information of the jobs output from the job selection unit 13. In addition, the job execution control unit 15 of the job manager 12 monitors the power consumption values of the ongoing jobs via the resource management unit 18 and stores the information of the executed jobs in the power consumption storage unit 17.

Next, the information of jobs will be described. The information of jobs (hereinafter referred to as registration information) is registered by a user, for example, when the jobs are submitted.

(Registration Information of Job)

FIGS. 4A and 4B are diagrams illustrating an example of the registration information of jobs. In a table H1 of FIG. 4A, the registration information of a job has, for example, job identification information, a job type, the number of used calculation nodes, the number of processes, an estimated I/O amount, and estimated execution time. However, the registration information of jobs is not limited to the example of FIG. 4A.

The job identification information represents, for example, a job name. The job type represents, for example, a sequential job or a parallel job. The sequential job represents, for example, a job independently executed between a plurality of calculation nodes 20. In addition, the parallel job represents, for example, a job cooperatively executed between a plurality of calculation nodes 20. The number of used calculation nodes represents the number of calculation nodes 20 used to execute a job. The number of processes represents the estimated number of processes generated when a job is executed. In addition, the estimated I/O amount represents the estimated amount of input and output operations to a file system executed in the course of a job. The estimated execution time represents estimated time from the execution start to the execution end of a job.

Further, a table H2 of FIG. 4B illustrates a specific example of the registration information of jobs. In the table H2, the job type of a job Aja is the sequential job, and the number of the used calculation nodes thereof is "eight." In addition, the number of the processes of the job Aja is "16," and the estimated I/O amount thereof is "30." Moreover, the estimated execution time of the job Aja is "five" hours long. That is, it is estimated that the job Aja ends five hours after the start of its execution. For other jobs, registration information as illustrated in the table H2 of FIG. 4B is similarly input by a user when the jobs are submitted.

Next, basic schedule processing for jobs will be described. Here, an example of jobs to be scheduled will be described.

FIG. 5 is a diagram illustrating an example of jobs to be scheduled according to the embodiment. In this example, five jobs Aja to Eje are submitted. In addition, FIG. 5 illustrates some of the registration information of the respective jobs Aja to Eje. Moreover, in this example, the jobs are submitted in order from the job Aja to the job Eje, and the priority of the jobs is set in order of submitting the jobs. Therefore, the job Aja is given the highest priority, and the job Bjb is given the second highest priority.

Specifically, in the example of FIG. 5, the number of the used calculation nodes of each of the jobs is eight for the job Aja, three for the job Bjb, 20 for the job Cjc, 12 for the job Djd, and 32 for the job Eje. In addition, the estimated execution time of each of the jobs Aja to Eje is five hours long for the job Aja, four hours long for the job Bjb, ten hours long for the job Cjc, one hour long for the job Djd, and six hours long for the job Eje. An estimated maximum power consumption value will be described later. Note that although the priority is set in order of submitting the jobs in the example of FIG. 5, it is not limited to this example. The priority of each of the jobs may be arbitrarily input by a user.

(Schedule Processing)

Figure 6:
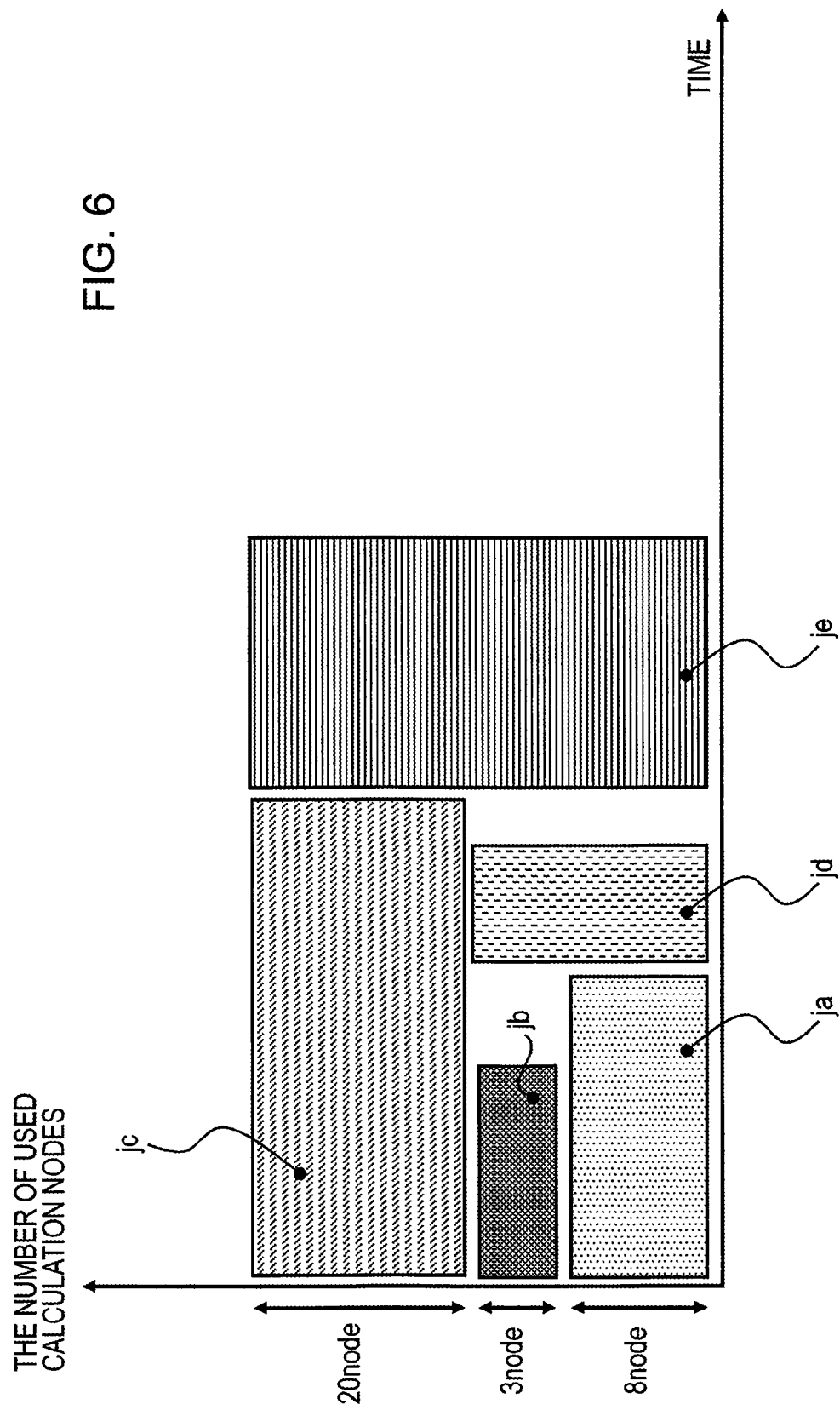
FIG. 6 is a diagram illustrating basic schedule processing for jobs.

FIG. 6 is a diagram illustrating basic schedule processing for jobs. In FIG. 6, a vertical axis represents the number of calculation nodes, and a horizontal axis represents time. In this example, the number of the calculation nodes 20 of the information processing system is, for example, 32. Therefore, a schedule is generated such that the total number of used calculation nodes allocated to each time block does not exceed 32.

Specifically, in the schedule processing, a schedule is generated in such a way that the calculation nodes 20 corresponding to the number of the used calculation nodes of jobs are allocated to a time block close to current time in order from the jobs given higher priority. First, the job Aja given the highest priority is to be scheduled. Accordingly, the job Aja, of which the number of the used calculation nodes is eight and the estimated execution time is five hours long, is scheduled in the time block of five hours after the current time. Therefore, the job Aja uses the eight calculation nodes 20 in the time block of the five hours after the current time.

Next, the job Bjb given the second highest priority is to be scheduled. Accordingly, the job Bjb, of which the number of the used calculation nodes is three and the estimated execution time is four hours long, is scheduled in the time block of four hours after the current time. Therefore, the 11 (=8+3) calculation nodes 20 are secured for the jobs Aja and Bjb in the time block of the four hours after the current time. In addition, the eight calculation nodes 20 are secured for the job Aja in the time block between the four hours and the five hours after the current time.

Then, the job Cjc, of which the number of the used calculation nodes is 20 and the estimated execution time is ten hours long, is scheduled in the time block of ten hours after the current time. Therefore, the 31 (=8+3+20) calculation nodes 20 are secured for the jobs Aja to Cjc in the time block of the four hours after the current time. Similarly, the 28 (=8+20) calculation nodes 20 are secured for the jobs Aja and Cjc in the time block between the four hours and the five hours after the current time, and the 20 calculation nodes 20 are secured for the job Cjc in the time block between the five hours and the ten hours after the current time. In these time blocks, the total number of the allocated calculation nodes 20 falls within the number (32) of the calculation nodes 20 of the information processing system according to the embodiment.

Then, the job Djd, of which the number of the used calculation nodes is 12 and the estimated execution time is one hour long, is to be scheduled. However, when the job Djd is scheduled in the time block of one hour after the current time, the total number of the allocated calculation nodes 20 in the time block of the one hour after the current time is 43 (=8+3+20+12). This number exceeds the number (32) of the calculation nodes 20 of the information processing system according to the embodiment. Accordingly, the job Djd is shifted to a future time block to prevent the total number of the allocated calculation nodes 20 from exceeding 32 and scheduled in the time block of one hour after the end of the job Aja. On this occasion, the jobs Cjc and Djd are scheduled in the time block of the one hour after the end of the job Aja, and the total number (32=20+12) of the allocated calculation nodes in the time block falls within 32.

In addition, the job Eje, of which the number of the used calculation nodes is 32 and the estimated execution time is six hours long, is scheduled in the time block of six hours after the end of the job Cjc to prevent the total number of the allocated calculation nodes 20 from exceeding 32. Thus, since the calculation nodes 20 are secured for the jobs given the higher priority, the jobs (the jobs Djd and Eje in this example) for which the calculation nodes may not be secured at the current time are scheduled in the future time blocks.

Next, a power consumption limit value will be described. The power consumption limit value represents the upper limit value of consumable power. In addition, the power consumption limit value is set with, for example, time.

(Power Consumption Limit Value)

Figure 7:
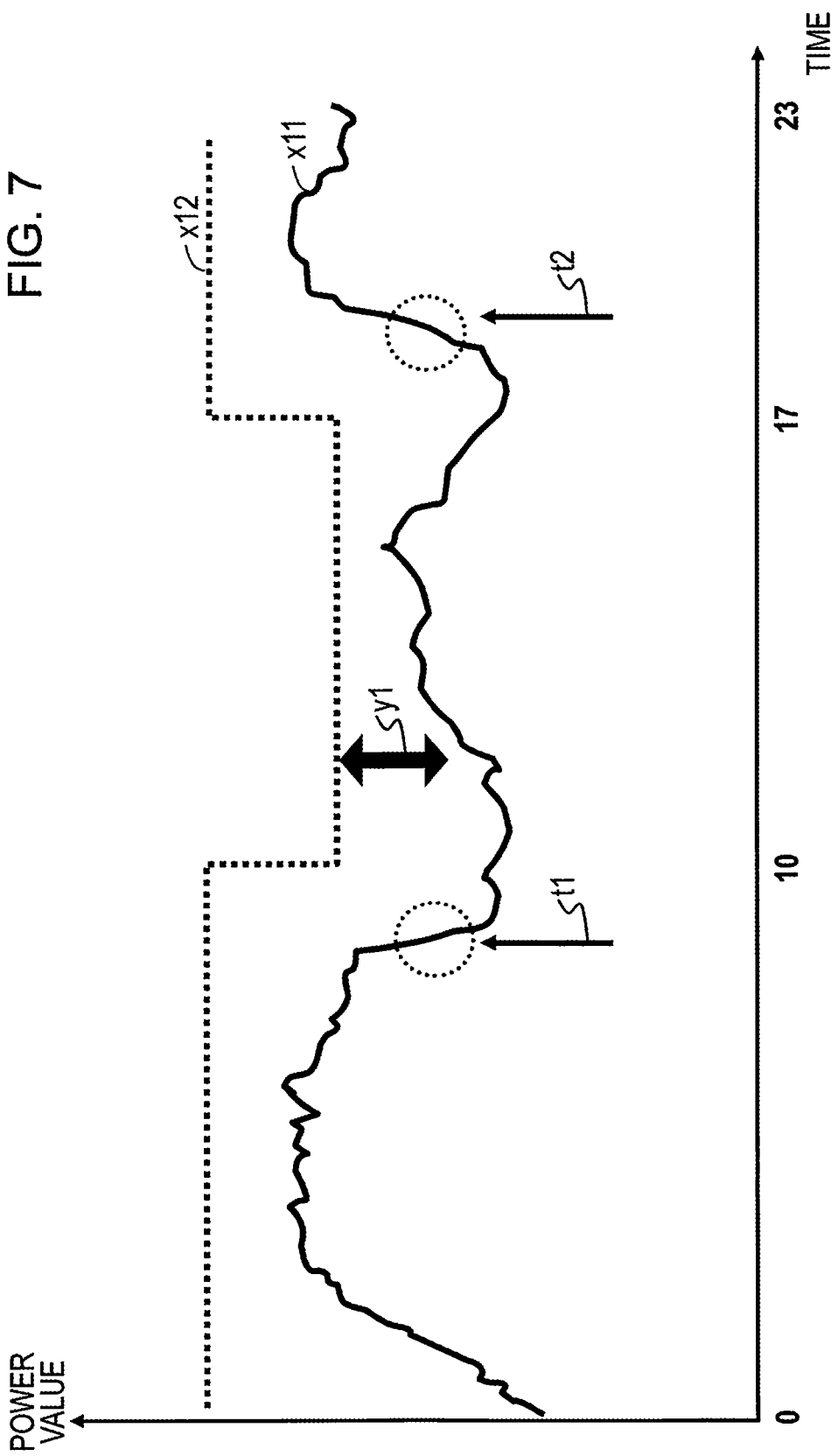
FIG. 7 is a diagram illustrating a power consumption limit value in a day.

FIG. 7 is a diagram illustrating a power consumption limit value in a day. In FIG. 7, a vertical axis represents a power value, and a horizontal axis represents time. In addition, a line x11 represents the record of a power consumption value, and a dashed line x12 represents the power consumption limit value.

In the example of the power consumption limit value of FIG. 7, the power consumption limit value x12 is reduced in the daytime time block between 10:00 a.m. and 17:00 p.m. Accordingly, the power supply of some of the hardware devices (the calculation nodes 20 and peripheral devices) of the system is controlled to be interrupted before 10:00 a.m. to reduce the power consumption value between 10:00 a.m. and 17:00 p.m. Then, after 17:00 p.m., the power supply is controlled to be input to the hardware devices whose power supply has been interrupted. As a result of such power supply control, the record x11 of the power consumption value is reduced at time t1 before 10:00 a.m. and increased at time t2 after 17:00 p.m.

However, the reduction in the power consumption value with the control of the power supply of some of the hardware devices is based on a rough estimate and the control of the power supply is performed on more of the hardware devices to make the power consumption value x11 reliably fall within the power consumption limit value x12. Thus, a difference y1 between the record x11 of the power consumption value and the power consumption limit value x12 is likely to become large. In addition, since the calculation nodes 20 become insufficient with the interruption control of the power supply of some of the calculation nodes 20, inexecutable jobs are caused.

In order to address this problem, the job management node 10 of the information processing system according to the embodiment acquires, as the estimated maximum power consumption value of a job to be scheduled, the maximum power consumption value of the calculation nodes 20 that have executed a job having job identification information same as that of the job to be scheduled or a job having the number of used calculation nodes same as that of the job to be scheduled or the number of used calculation nodes different from that of the job to be scheduled by a prescribed range. Further, the job management node 10 schedules the job to be scheduled so as to prevent a sum obtained by adding the estimated maximum power consumption value of the job to be scheduled from exceeding a power consumption limit value according to time of day.

As described above, the job management node 10 according to the embodiment acquires the estimated maximum power consumption value of a job to be scheduled based on the registration information of the job and the record information of an executed job. Then, the job management node 10 is allowed to generate, based on the estimated maximum power consumption value of each job, the schedule of a job such that the peak of the value of power consumed by the job falls within a power consumption limit value in advance. In this way, the information processing system according to the embodiment implements the flexible scheduling of a job based on a power consumption limit value set according to time of day. Accordingly, the information processing system is allowed to efficiently execute a job executable within the range of a power consumption limit value.

Here, processing for acquiring the estimated maximum power consumption value of a job will be first described in detail. The two cases of processing for acquiring an estimated maximum power consumption value will be described.

(Processing for Acquiring Estimated Maximum Power Consumption Value)

A first example will be described. The value of power consumed by a job varies with, for example, the number of the used calculation nodes, the number of the processes, and the I/O amount of the job. Therefore, in the first example, the power consumption estimation unit 16 of the job management node 10 acquires the estimated maximum power consumption value of a job based on the number of the used calculation nodes, the number of the processes, and the estimated I/O amount of the job to be scheduled. More specifically, the power consumption estimation unit 16 acquires, as the estimated maximum power consumption value of a job (for example, the job Aja) to be scheduled, the record of the maximum power consumption value of an executed job having the number of used calculation nodes, the number of processes, and an estimated I/O amount same as those of the job to be scheduled. Thus, the power consumption estimation unit 16 acquires the estimated maximum power consumption value (20 kW in this example) of the job Aja. The number of used calculation nodes of the executed job may be the number of used calculation nodes registered as the registration information and may be the results by executing. It is similar about the number of the processes, the estimated I/O amount. The result of the number of the processes and the I/O amount of the executed job are for example stored in the power consumption storage unit 17.

Alternatively, the power consumption estimation unit 16 acquires, as the estimated maximum power consumption value of a job to be scheduled, the record of the maximum power consumption value of an executed job having the number of used calculation nodes, the number of processes, an estimated I/O amount different from those of the job to be scheduled by a prescribed range.

For example, the power consumption estimation unit 16 acquires, as the estimated maximum power consumption value of a job to be scheduled, the record of the maximum power consumption value of an executed job having the number of used calculation nodes, the number of processes, and an estimated I/O amount different from those of the job to be scheduled by a prescribed value range. The prescribed value range is set, for example, for each of the number of used calculation nodes, the number of processes, and an estimated I/O amount. Note that since the prescribed value range is different with variations in the specifications of calculation nodes, the number of used calculation nodes, the number of processes, the value of an estimated I/O amount, or the like, it is set in advance based on, for example, an experimental value. With the prescribed value range set to an appropriate value, the power consumption estimation unit 16 is allowed to more accurately acquire an estimated maximum power consumption value.

Alternatively, for example, the power consumption estimation unit 16 acquires, as the estimated maximum power consumption value of a job to be scheduled, the record of the maximum power consumption value of an executed job having the number of used calculation nodes, the number of processes, and an estimated I/O amount different in ratio from those of the job to be scheduled by a prescribed range. For example, it is assumed that the number of the used calculation nodes of a job to be scheduled is 50 and the number of the calculation nodes of an executed job is 60. In this case, the difference ratio is 20% (=10 (the difference)/50 (the number of the used calculation nodes)×100). For each of the number of processes and an estimated I/O amount, the power consumption estimation unit 16 also calculates the difference ratio in the same way. Then, the power consumption estimation unit 16 acquires, as the estimated maximum power consumption value of a job to be scheduled, the record of the maximum power consumption value of an executed job having the number of processes and an estimated I/O amount different in ratio from those of the job to be scheduled by a prescribed range.

Note that since the prescribed range of a difference ratio is also different with variations in the specifications of calculation nodes, the number of used calculation nodes, the number of processes, the value of an estimated I/O amount, or the like, it is set in advance based on, for example, an experimental value.

As described above, the power consumption estimation unit 16 acquires, as the estimated maximum power consumption value of a job to be scheduled, the record value of the maximum power consumption value of an executed job having registration information partially same as that of the job to be scheduled or registration information partially different from that of the job to be scheduled by a prescribed range. Thus, the power consumption estimation unit 16 is allowed to accurately acquire the estimated maximum power consumption value of a job to be scheduled based on the registration information and the record value of the maximum power consumption value of the job.

Note that among the number of used calculation nodes, the number of processes, and an estimated I/O amount, the number of used calculation nodes has the greatest impact on the value of power consumed by a job. Therefore, the power consumption estimation unit 16 may acquire, as the estimated maximum power consumption value of a job to be scheduled, the record of the maximum power consumption value of an executed job having the number of used calculation nodes same as that of the job (for example, the job Aja) to be scheduled or the number of used calculation nodes different from that of the job to be scheduled by a prescribed range. Alternatively, the power consumption estimation unit 16 may acquire the estimated maximum power consumption value of a job to be scheduled based on any of the number of processes and an estimated I/O amount besides the number of the used calculation nodes of the job to be scheduled.

Next, a second example will be described. For example, since the processing contents of two jobs having the same job name (job identification information) are highly likely to be similar to each other, it is assumed that their maximum power consumption values are also approximate to each other. Therefore, in the second example, the power consumption estimation unit 16 of the job management node 10 acquires, based on the job identification information of a job to be scheduled, the estimated maximum power consumption value of the job. More specifically, the power consumption estimation unit 16 acquires, as the estimated maximum power consumption value of a job to be scheduled, the record of the maximum power consumption value of an executed job having job identification information same as that of the job (for example, the job Aja) to be scheduled. Thus, the power consumption estimation unit 16 is allowed to acquire the estimated maximum power consumption value of a job.

Alternatively, the power consumption estimation unit 16 may acquire, as the estimated maximum power consumption value of a job to be scheduled, the record of the maximum power consumption value of an executed job having the same job type besides job identification information. The job type represents, for example, a type such as a sequential job and a parallel job illustrated in FIG. 4A, a group into which a job is arbitrarily classified according to the processing content of the job, or the like. Based on job identification information and a job type, the power consumption estimation unit 16 is allowed to more accurately discriminate a job having the same processing content and more accurately acquire an estimated maximum power consumption value.

As described above, an estimated maximum power consumption value is acquired for each job. Next, the outline of schedule processing according to the embodiment will be described.

Outline of Schedule Processing According to Embodiment

Figure 8:
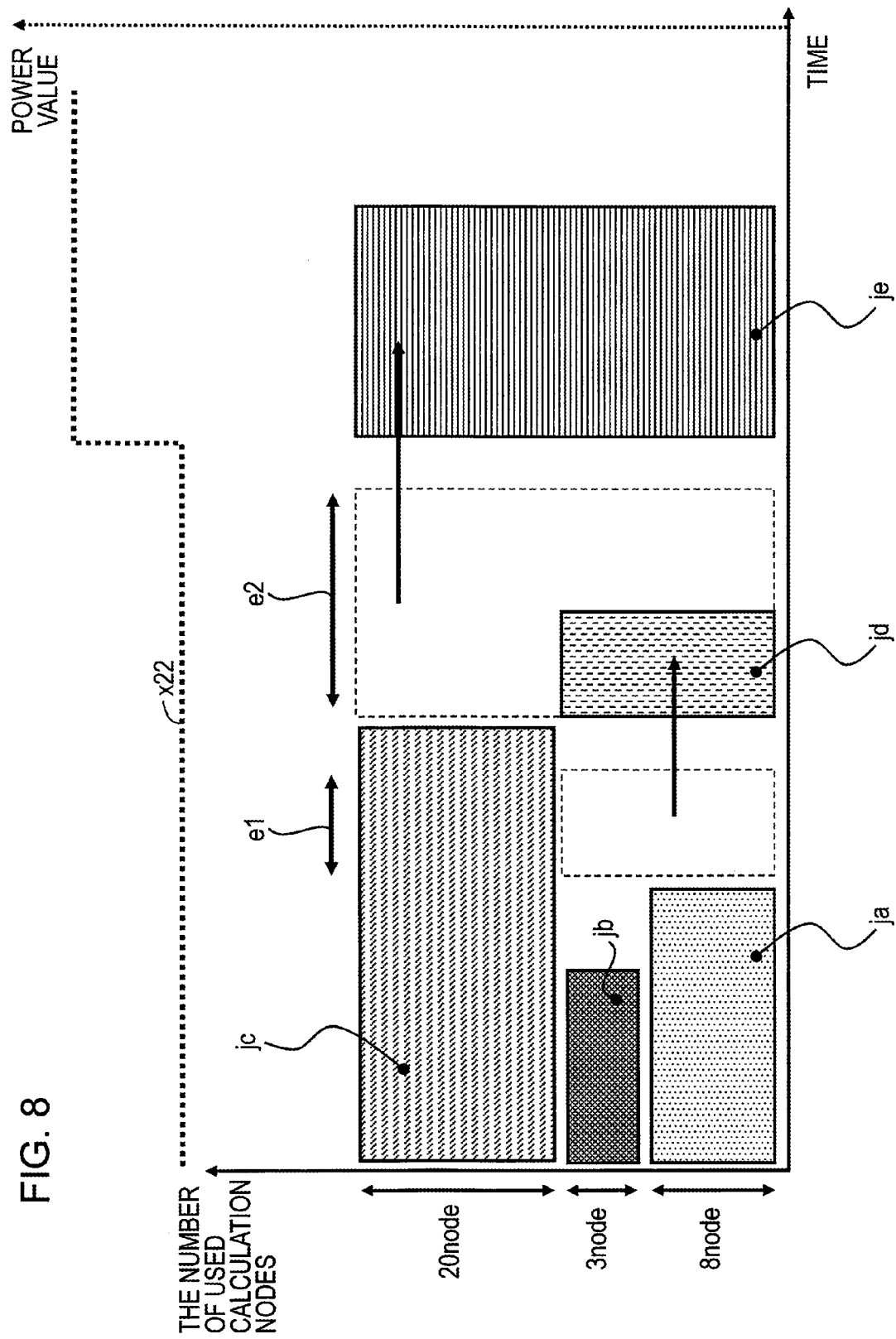
FIG. 8 is a diagram illustrating the outline of the schedule processing according to the embodiment.

FIG. 8 is a diagram illustrating the outline of the schedule processing according to the embodiment. In FIG. 8, a vertical axis on the left side represents the number of calculation nodes, a vertical axis on the right side represents a power value, and a horizontal axis represents time. In addition, a dashed line x22 represents a power consumption limit value. Like the example of FIG. 6, the schedules of the jobs Aja to Eje are generated.

In the embodiment, the job management node 10 generates the schedules such that the sum of the number of the calculation nodes 20 used by the jobs falls within the number (32) of the calculation nodes 20 of the information processing system and the sum of the estimated maximum power consumption values of the jobs falls within the power consumption limit value x22. First, the job management node 10 acquires the estimated maximum power consumption value (20 kW) of the job Aja and schedules the job Aja in the time block of five hours after current time. Thus, in the time block of the five hours after the current time, the eight calculation nodes 20 are allocated to the job Aja, and the estimated maximum power consumption value is 20 kW. In addition, the jobs Bjb and Cjc are scheduled like the example of FIG. 6.

However, when the job Djd is scheduled in the time block of one hour after the job Aja ends like the example of FIG. 6, the sum of the estimated maximum power consumption values of the jobs (the jobs Cjc and Djd) in a time block e1 exceeds the power consumption limit value x22. Therefore, the job management node 10 shifts a time block for scheduling the job Djd to a later time block such that the estimated maximum power consumption value of the job in the time block e1 falls within the power consumption limit value x22. Thus, the job Djd is scheduled in the time block of the one hour after the job Aja ends, and the estimated maximum power consumption value of the job (the job Cjc) in the time block e1 falls within the power consumption limit value x22.

When the jobs are scheduled as in FIG. 6, the sum of the estimated maximum power consumption values of the jobs in a time block e2 exceeds the power consumption limit value x22. Note that the estimated maximum power consumption value of the job Eje by itself exceeds the power consumption limit value x22 in the time block e2. Therefore, the job management node 10 schedules the job Eje in a time block in which the power consumption limit value x22 exceeds the estimated maximum power consumption value of the job Eje. As described above, the job management node 10 according to the embodiment is allowed to schedule each of the jobs Aja to Eje based on the estimated maximum power consumption values of the jobs such that the sum of the estimated maximum power consumption values of the jobs in each of the time blocks falls within the power consumption limit value x22.

Next, before the details of each processing of the job management node 10 according to the embodiment, the entire processing of the job management node 10 will be chronologically described.

(Outline of Processing of Job Management Node 10)

Figure 9:
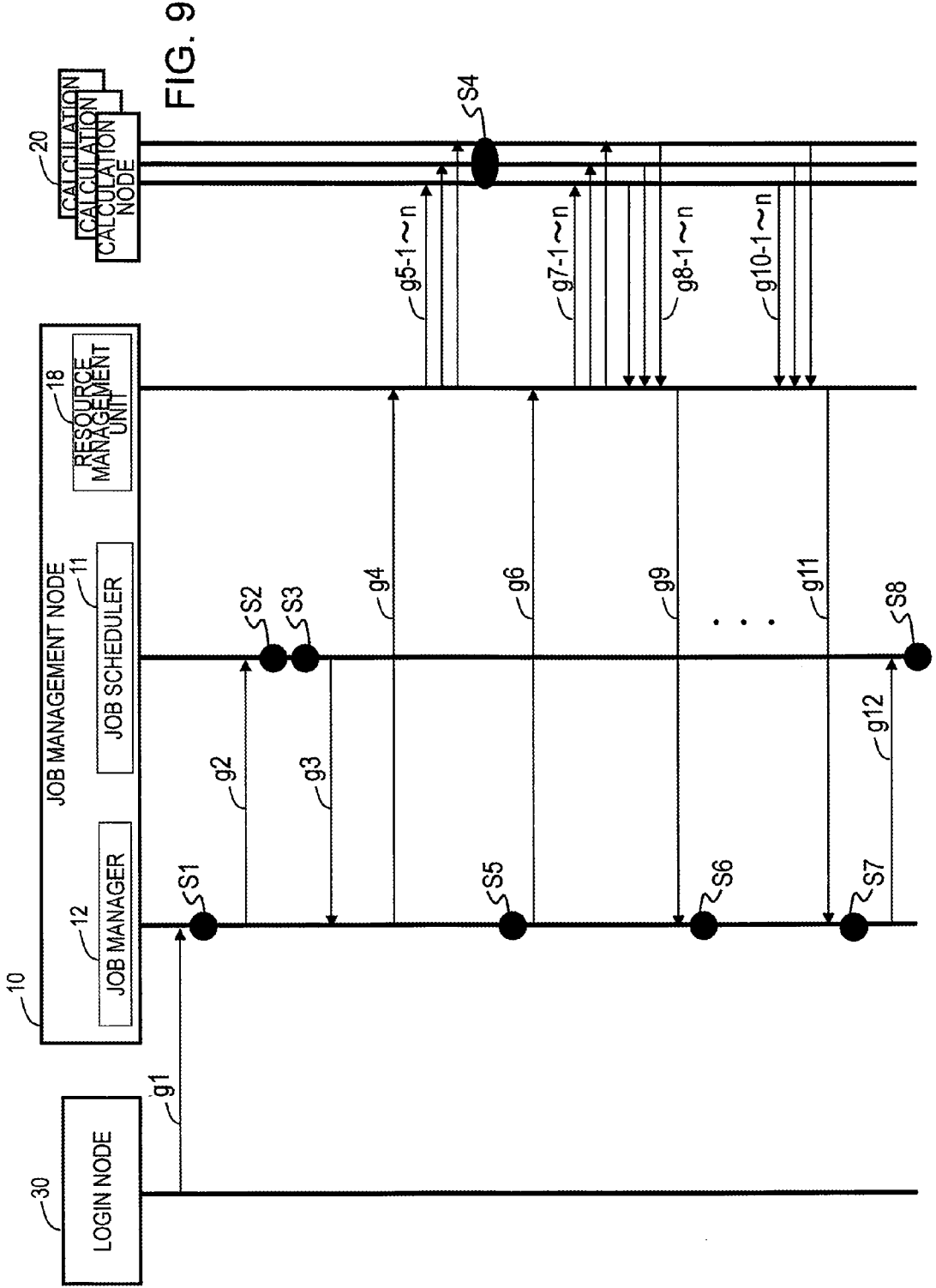
FIG. 9 is a diagram chronologically illustrating the outline of the entire processing of the job management node 10 according to the embodiment.

FIG. 9 is a diagram chronologically illustrating the outline of the entire processing of the job management node 10 according to the embodiment. First, when jobs are submitted in the login node 30 by a user, the login node 30 outputs the registration information of the jobs to the job manager 12 (g1). The registration information of the jobs is input by, for example, the user. Next, in response to the submission of the jobs, the job manager 12 of the job management node 10 acquires the estimated maximum power consumption values of the jobs (S1). After acquiring the estimated maximum power consumption values of the jobs, the job manager 12 outputs the registration information of the jobs to the job scheduler 11 (g2). Then, the job scheduler 11 generates the schedules of the jobs based on the registration information of the jobs (S2).

Next, the job scheduler 11 monitors the execution start times of the scheduled jobs (S3) and requests the job manager 12 to execute the jobs that may be started (g3). In response to the request for executing the jobs, the job manager 12 requests the resource management unit 18 to execute the jobs (g4). Then, the resource management unit 18 instructs the calculation nodes 20 corresponding to the number of the used calculation nodes of the jobs to execute the jobs (g5-1 to g5-$n$). Next, in response to the request for executing the jobs from the resource management unit 18, the calculation nodes 20 execute the jobs (S4).

In addition, while the jobs are executed by the calculation nodes 20, the job manager 12 periodically monitors the power consumption values of the ongoing jobs (S5). Specifically, the job manager 12 instructs the resource management unit 18 to acquire the power consumption values of the ongoing jobs (g6). In response to this, the resource management unit 18 acquires the power consumption values (g7-1 to g7-$n$ and g8-1 to g8-$n$) of the ongoing jobs from the respective calculation nodes 20 and outputs them to the job manager 12 (g9). Then, when the sum of the acquired power consumption values of the ongoing jobs exceeds a power consumption limit value, the job manager 12 coordinates the execution of the ongoing jobs as occasion demands (S6). The details of processing for coordinating the execution will be described later.

Next, when the execution of the jobs by the calculation nodes 20 ends, the resource management unit 18 acquires the end notifications of the jobs and the maximum power consumption values of the jobs (g10-1 to g10-$n$). Then, the resource management unit 18 outputs the end notifications of the jobs and the maximum power consumption values of the jobs to the job manager 12 (g11), and the job manager 12 stores the maximum power consumption values of the jobs in the power consumption storage unit 17 (S7). In addition, the job manager 12 outputs the end notifications of the jobs to the job scheduler 11 (g12). In response to the end notifications of the jobs, the job scheduler 11 performs processing for clearing the registration information of the jobs (S8).

Based on the flow illustrated in FIG. 9, a series of the processing from the submission to the execution control of the jobs is performed. Next the details of each processing of the job management node 10 will be described based on a flowchart. First, the schedule processing of the job scheduler 11 of the job management node 10 will be described.

(Flowchart: Schedule Processing)

Figure 10:
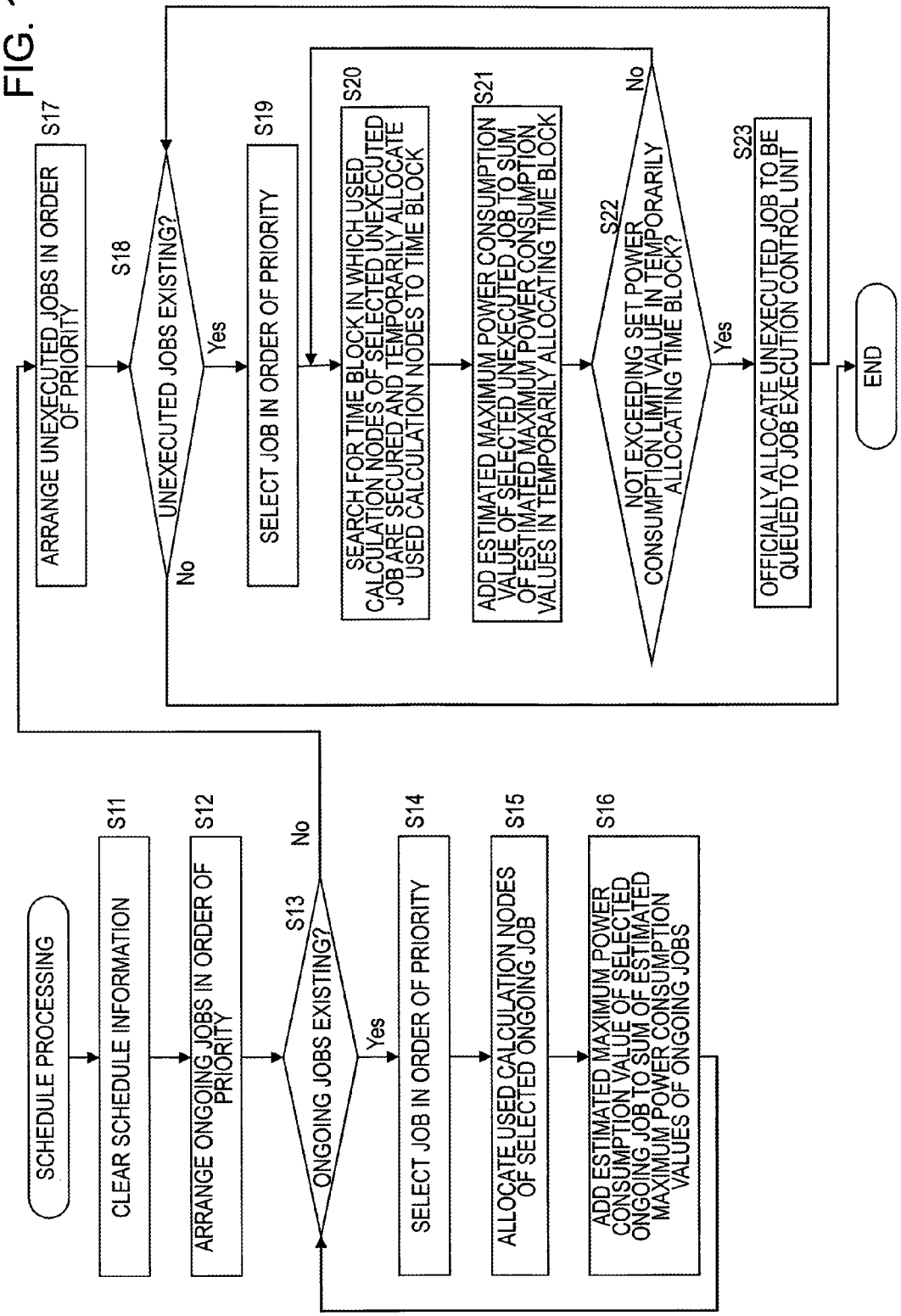
FIG. 10 is a flowchart illustrating the schedule processing of jobs.

FIG. 10 is a flowchart illustrating the schedule processing of jobs. First, the job allocation unit 14 clears generated schedule information (S11). Next, the job allocation unit 14 arranges ongoing jobs in order of priority (S12).

When the ongoing jobs exist (YES in S13), the job allocation unit 14 selects one of the ongoing jobs in order of priority (S14). Next, the job allocation unit 14 allocates the calculation nodes of the number of the used calculation nodes of the ongoing job to a scheduled time block in which the selected ongoing job is to be executed (S15). In addition, the job allocation unit 14 adds the estimated maximum power consumption value of the selected ongoing job to the sum of the estimated maximum power consumption values of allocated ongoing jobs (S16). Then, the job allocation unit 14 performs the processing of steps S14 to S16 on the ongoing job given the second highest priority.

On the other hand, when all the ongoing jobs are allocated (NO in S13) or when the ongoing jobs do not exist (NO in S13), the job allocation unit 14 arranges unexecuted jobs in order of priority (S17). When the unexecuted jobs exist (YES in S18), the job allocation unit 14 selects one of the unexecuted jobs in order of priority (S19). Next, the job allocation unit 14 searches for a time block in which the used calculation nodes of the selected unexecuted job may be secured and temporarily allocates the calculation nodes of the number of the used calculation nodes to the time block (S20).

Then, the job allocation unit 14 adds the estimated maximum power consumption value of the selected unexecuted job to the sum of the estimated maximum power consumption values of the allocated jobs (S21). Next, the job allocation unit 14 determines whether the sum of the estimated maximum power consumption values in the time block to which the selected unexecuted job has been temporarily allocated exceeds a power consumption limit value (S22). When the sum of the estimated maximum power consumption values exceeds the power consumption limit value (NO in S22), the job allocation unit 14 searches for another time block in which the calculation nodes of the number of the used calculation nodes of the selected unexecuted job may be secured, temporarily allocates the calculation nodes of the number of the used calculation nodes to the time block (S20), and performs the processing of steps S21 and S22. On the other hand, when the sum of the estimated maximum power consumption values does not exceed the power consumption limit value (YES in S22), the job allocation unit 14 formally allocates the calculation nodes of the number of the used calculation nodes of the selected unexecuted job to the temporarily allocated time block and queued to the job execution control unit 15 (S23).

Next, the job allocation unit 14 performs the processing of step S19 to S23 on the unexecuted job given the second highest priority. When the job allocation unit 14 performs the allocation processing on all the unexecuted jobs, it ends the schedule processing.

Then, processing for controlling the execution of jobs of the job management node 10 will be described.

(Flowchart: Processing for Controlling Execution of Jobs)

Figure 11:
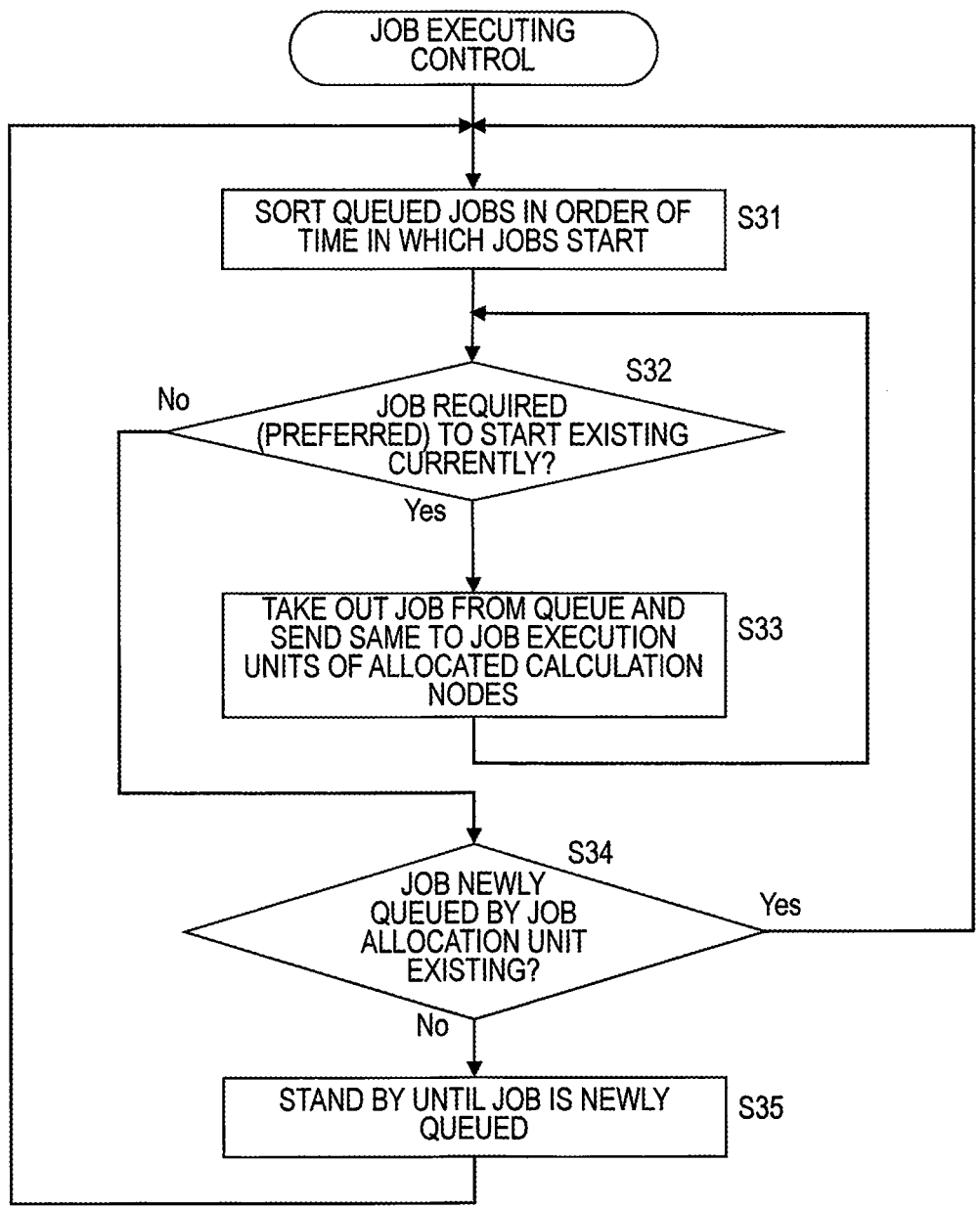
FIG. 11 is a flowchart illustrating the processing for controlling the execution of jobs.

FIG. 11 is a flowchart illustrating the processing for controlling the execution of jobs. The job execution control unit 15 of the job management node 10 sorts unexecuted jobs queued by the job allocation unit 14 in order of execution start time (S31). Next, the job execution control unit 15 determines whether a job required (preferred) to be controlled to start exists currently (S32). When the job required (preferred) to be controlled to start exists (YES in S32), the job execution control unit 15 takes out the job from a queue and instructs the job execution units 20 of the allocated calculation nodes 20 to execute the job (S33).

On the other hand, when the job required (preferred) to be controlled to start does not exist (NO in S32), the job execution control unit 15 determines whether a job newly queued by the job allocation unit 14 exists (S34). When the job newly queued exists (YES in S34), the job execution control unit 15 returns to the processing of step S31. On the other hand, when the job newly queued does not exist (NO in S34), the job execution control unit 15 is on standby until the job is newly queued (S35). Then, when the job is newly queued, the job execution control unit 15 returns to the processing of step S31.

Next, processing for monitoring the power consumption values of ongoing jobs by the job manager 12 of the job management node 10 will be described.

(Processing for Monitoring Power Consumption Values of Ongoing Jobs)

Figure 12:
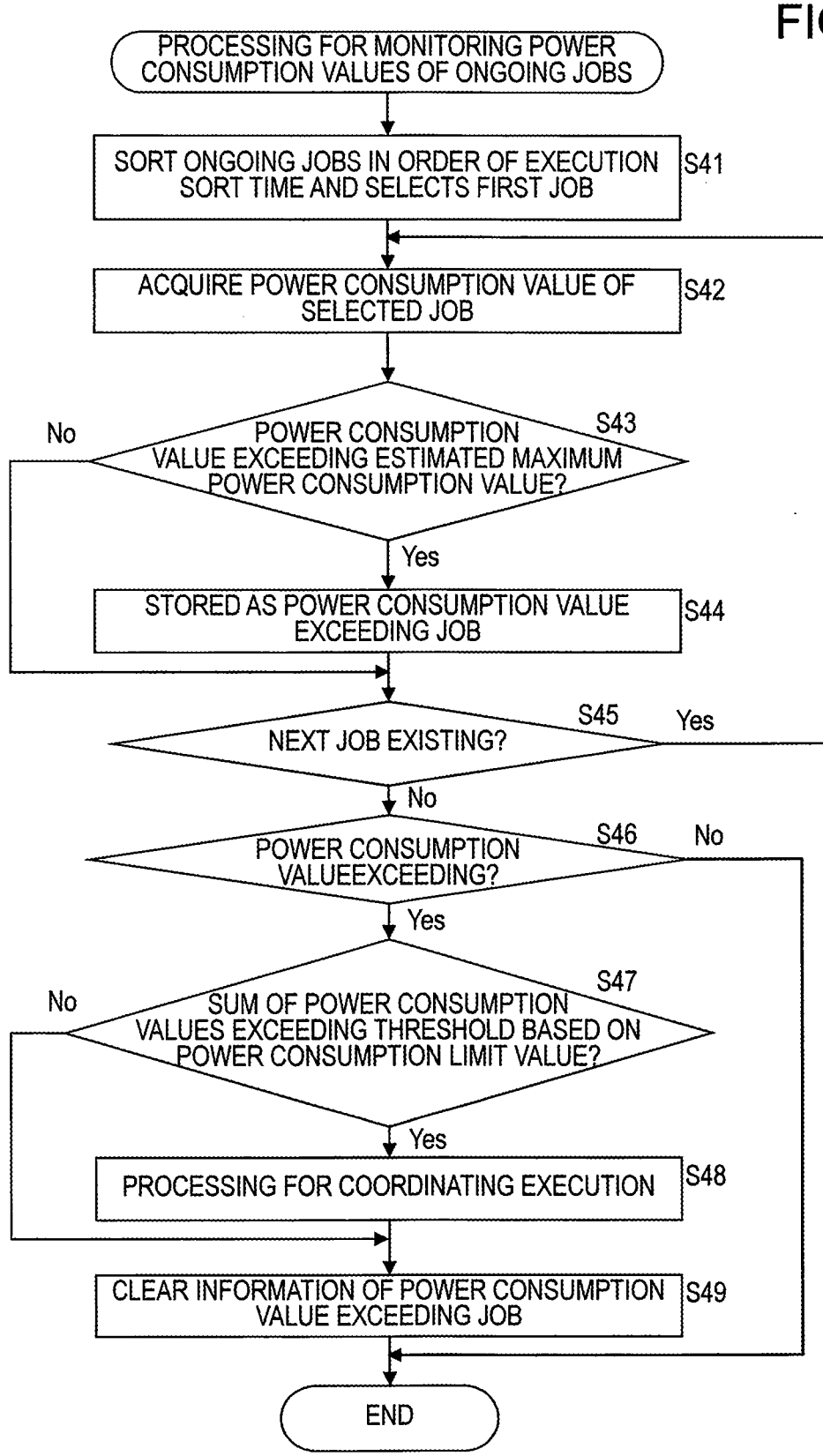
FIG. 12 is a flowchart illustrating the processing for monitoring the power consumption values of ongoing jobs.

FIG. 12 is a flowchart illustrating the processing for monitoring the power consumption values of ongoing jobs. The job execution control unit 15 of the job manager 12 sorts the ongoing jobs in order of execution start time, and selects the first one of the jobs (S41). The job execution control unit 15 acquires the current power consumption value of the selected ongoing job (S42). Specifically, the job execution control unit 15 acquires the power consumption value of the ongoing job based on a power consumption value acquired from the power consumption measurement unit 21 by the calculation nodes 20 that execute the ongoing job. Next, the job execution control unit 15 determines whether the acquired power consumption value of the ongoing job exceeds an estimated maximum power consumption value (S43).

When the power consumption value of the selected job exceeds the estimated maximum power consumption value (YES in S43), the job execution control unit 15 stores the selected ongoing job as a power consumption value exceeding job (S44). On the other hand, when the power consumption value of the selected job does not exceed the estimated maximum power consumption value (NO in S43), the job execution control unit 15 determines whether a next ongoing job exists (S45). When the next ongoing job exists (YES in S45), the job execution control unit 15 performs the processing of steps S42 to S44 on the next ongoing job.

On the other hand, when the next ongoing job does not exist (NO in S45), the job execution control unit 15 then determines whether the power consumption value exceeding job has been detected (S46). When the power consumption value exceeding job has not been detected (NO in S46), the job execution control unit 15 ends the processing for monitoring the power consumption values of the ongoing jobs. On the other hand, when the power consumption value exceeding job has been detected (YES in S46), the job execution control unit 15 determines whether the sum of the power consumption values of all the ongoing jobs exceeds a threshold based on a power consumption limit value (S47). The threshold based on the power consumption limit value represents, for example, a value of 90% of the power consumption limit value. Alternatively, in step S47, the job execution control unit 15 may determine whether the sum of the power consumption values of all the ongoing jobs exceeds the power consumption limit value.

When the sum of the power consumption values of all the ongoing jobs exceeds the threshold based on the power consumption limit value (YES in S47), the job execution control unit 15 performs processing for coordinating the execution of the ongoing jobs (S48). On the other hand, when the sum of the power consumption values of all the ongoing jobs does not exceed the threshold based on the power consumption limit value (NO in S47), the job execution control unit 15 does not perform the processing for coordinating the execution of the ongoing jobs. Next, the job execution control unit 15 performs processing for clearing the information of the power consumption value exceeding job (S49).

As described above, the job management node 10 according to the embodiment does not perform the processing for coordinating the execution of ongoing jobs when the sum of the power consumption values of all the ongoing jobs does not exceed a power consumption limit value or a threshold based on the power consumption limit value even in a case in which a power consumption value exceeding job whose power consumption value exceeds an estimated maximum power consumption value has been detected. Thus, the job management node 10 is allowed to reduce the frequency of the processing for coordinating the execution of ongoing jobs even in a case in which the actual maximum power consumption values of the ongoing jobs exceed estimated maximum power consumption values.

Next, the processing for coordinating the execution of the ongoing jobs (S48) in the flowchart of FIG. 12 will be described.

(Flowchart: Processing for Coordinating Execution)

Figure 13:
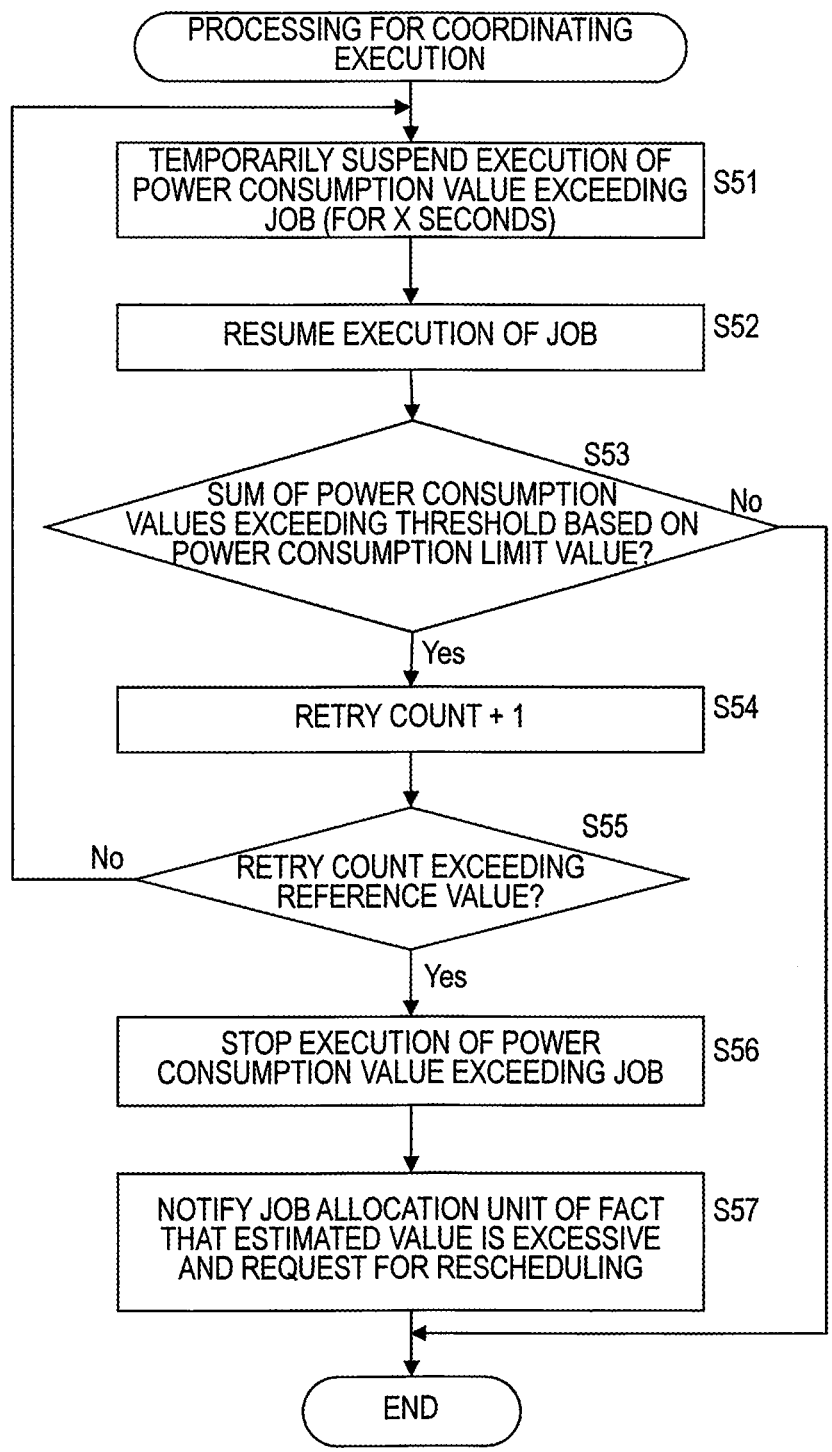
FIG. 13 is a flowchart illustrating the processing for coordinating the execution (S48 in FIG. 12).

FIG. 13 is a flowchart illustrating the processing for coordinating the execution (S48 in FIG. 12). The job execution control unit 15 temporarily suspends the processing of the power consumption value exceeding job whose power consumption value exceeds the estimated maximum power consumption value for X seconds for example (S51) and then resumes the processing (S52). The value X is set in advance based on, for example, an experimental value. Next, the job execution control unit 15 determines again whether the sum of the power consumption values of the ongoing jobs exceeds the threshold based on the power consumption limit value (or the power consumption limit value) (S53). If the sum of the power consumption values of the ongoing jobs does not exceed the threshold based on the power consumption limit value (NO in S53), the job execution control unit 15 ends the processing for coordinating the execution.

On the other hand, when the sum of the power consumption values of the ongoing jobs exceeds the threshold based on the power consumption limit value (YES in S53), the job execution control unit 15 increments a retry count (S54). Next, the job execution control unit 15 determines whether the retry count exceeds a reference value (S55). When the retry count does not exceed the reference value (NO in S55), the job execution control unit 15 performs the processing of steps S51 to S54 on the power consumption value exceeding job again. On the other hand, when the retry count exceeds the reference value (YES in S55), i.e., when the sum of the power consumption values of the ongoing jobs exceeds the threshold based on the power consumption limit value even in a case in which the power consumption value exceeding job is temporarily suspended by the number of times corresponding to the reference value, the job execution control unit 15 stops the processing for executing the power consumption value exceeding job (S56). Then, the job execution control unit 15 notifies the job allocation unit 14 of the fact that the estimated maximum power consumption value of the power consumption value exceeding job is excessive and requests for the rescheduling of the power consumption value exceeding job (S57). Accordingly, the job allocation unit 14 reschedules, for example, processing after the stop of the power consumption value exceeding job.

According to the embodiment, the job management node 10 acquires, as the estimated maximum power consumption value of a job to be scheduled, the maximum power consumption value of the calculation nodes 20 that has executed a job having job identification information same as that of the job to be scheduled or a job having the number of used calculation nodes same as that of the job to be scheduled or the number of used calculation nodes different from that of the job to be scheduled by a prescribed range. Therefore, the estimated maximum power consumption value of a job to be scheduled may exceed its power consumption value (actually measured power consumption value) when the job is actually executed. That is, an error may occur in the estimate of the maximum power consumption value of a job.

In view of this, as in FIGS. 12 and 13, the job management node 10 according to the embodiment monitors the power consumption values of the ongoing jobs and performs the processing for coordinating the execution of the ongoing jobs when the sum of the power consumption values exceeds a power consumption limit value or a threshold based on the power consumption limit value. Thus, the job management node 10 is allowed to make the sum of the maximum power consumption values of ongoing jobs fall within a power consumption limit value even in a case in which the estimated maximum power consumption values of jobs exceeds their maximum power consumption values when the jobs are actually executed.

Note that although the job management node 10 performs the temporary suspend control and the stop control on the power consumption value exceeding job to reduce the power consumption values in the example of FIG. 13, the reduction in the power consumption values is not limited to this example. For example, the job management node 10 may perform the temporary suspend control and the stop control on an ongoing job other than the power consumption value exceeding job such as a job given lower priority and a job given a higher power consumption value to reduce the power consumption values.

Next, the processing of the job management node 10 according to the embodiment described above based on FIGS. 10 to 13 will be described using a specific example. First, a power consumption limit value in the specific example will be described.

Specific Example

Power Consumption Limit Value

FIG. 14 is a diagram illustrating a change in the power consumption limit value in the specific example. In the specific example, the power consumption limit value between 0:00 a.m. and 6:59 a.m. on weekdays is 100 kW as illustrated in FIG. 14. In addition, the power consumption limit value between 7:00 a.m. and 10:59 a.m. on weekdays is 80 kW. Moreover, the power consumption limit value between 11:00 a.m. and 14:59 p.m. is 60 kW, the power consumption limit value between 15:00 p.m. and 18:59 p.m. is 80 kW, and the power consumption limit value between 19:00 p.m. and 23:59 p.m. is 100 kW.

As described above, in the specific example of FIG. 14, the power consumption limit value is kept at a low level in, for example, a daytime time block (for example, between 7:00 a.m. and 18:59 p.m.). Therefore, jobs consuming a large amount of power are executed in, for example, a nighttime time block (for example, between 19:00 p.m. and 6:59 a.m.). Note that in the example of FIG. 14, the power consumption limit value is separately set for weekdays and for Saturdays and Sundays. The setting of the power consumption limit value is not limited to this example, but it may be uniformly set with respect to all the days or may be set for each of the days.

Specific Example

Schedule Processing

Figure 15A:
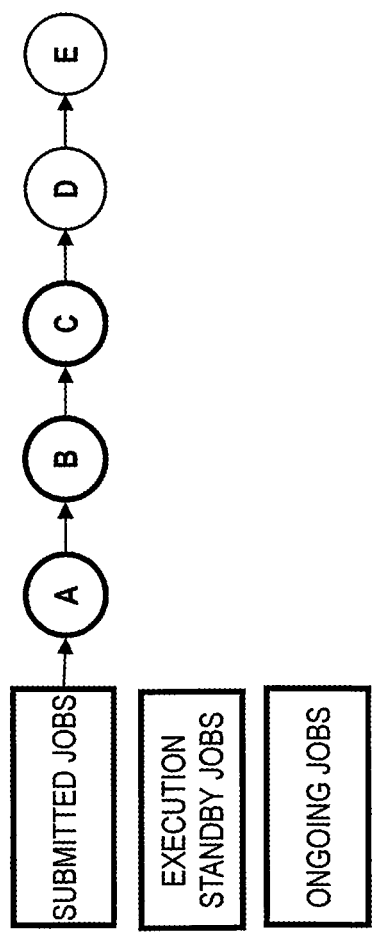
FIGS. 15A and 15B are diagrams illustrating the jobs Aja to Eje in the specific example.
Figure 15B:
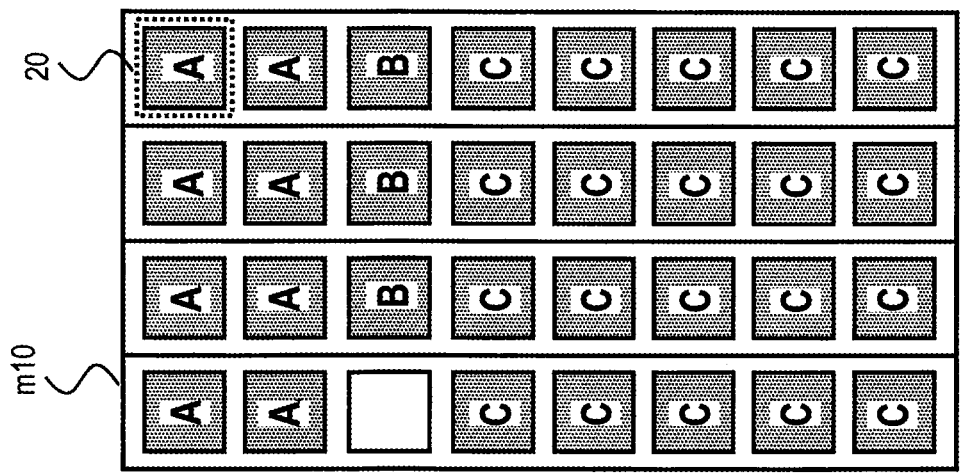

FIGS. 15A and 15B are diagrams illustrating the jobs Aja to Eje in the specific example. The specific example illustrates a case in which the jobs Djd and Eje are newly submitted while the jobs Aja to Cjc are ongoing and the schedule processing of the jobs are performed. As illustrated in FIG. 15A, the jobs are first arranged in order of priority in the line of the submitted jobs. In this example, the priority is high in order from the job Aja to the job Eje. While, FIG. 15B is a resource map m10 illustrating the using statuses of the calculation nodes 20. In this example, the number of the calculation nodes 20 of the information processing system is 32. Therefore, the resource map m10 has 32 frames corresponding to the number of the calculation nodes 20, and the names of the jobs which are being used by the calculation nodes 20 are indicated in the respective frames.

The registration information of the jobs Aja to Eje is illustrated in FIG. 5. That is, the number of the calculation nodes of each of the jobs is eight for the job Aja, three for the job Bjb, 20 for the job Cjc, 12 for the job Djd, and 32 for the job Eje. In FIG. 15B, it is illustrated that the 31 (=8+3+20) calculation nodes 20 among the 32 calculation nodes 20 are being used corresponding to the ongoing jobs Aja to Cjc. In addition, as illustrated in FIG. 5, the estimated execution time of each of the jobs Aja to Eje is five hours long for the job Aja, four hours long for the job Bjb, ten hours long for the job Cjc, one hour long for the job Djd, and six hours long for the job Eje. Moreover, the estimated maximum power consumption value of each of the jobs Aja to Eje is 20 kW for the job Aja, 10 kW for the job Bjb, 50 kW for the job Cjc, 40 kW for the job Djd, and 100 kW for the job Eje.

FIGS. 16A and 16B are first diagrams illustrating the schedule processing. As described above, the jobs Aja to Cjc among the submitted jobs Aja to Eje are the ongoing jobs. Accordingly, the job allocation unit 14 clears the schedule information (S11 in FIG. 10) and arranges the ongoing jobs in order from the job Aja to the job Cjc in the line of the ongoing jobs as illustrated in FIG. 16A (S12). Then, the job allocation unit 14 allocates the job Aja given the highest priority to the execution time block between 6:00 a.m. and 11:00 a.m. (YES in S13, S14, and S15). Similarly, the job allocation unit 14 allocates the job Bjb given the second highest priority to the execution time block between 6:00 a.m. and 10:00 a.m. as illustrated in FIG. 16B (YES in S13, S14, and S15). Similarly, the job allocation unit 14 allocates the job Cjc given the third highest priority to the execution time block between 6:00 a.m. and 16:00 p.m. (YES in S13, S14, and S15).

In the manner described above, the processing for allocating the ongoing jobs Aja to Cjc is first performed. On this occasion, the sum of the estimated maximum power consumption values in the time block between 6:00 a.m. and 10:00 a.m. (in a resource map mu) in which the jobs Aja to Cjc are executed is 80 kW. In addition, the sum of the estimated maximum power consumption values in the time block between 10:00 a.m. and 11:00 a.m. (in a resource map m12) in which the jobs Aja and Cjc are executed is 70 kW, and the estimated maximum power consumption value in the time block between 11:00 a.m. and 16:00 p.m. (in a resource map m13) in which only the job Cjc is executed is 50 kW. In this state, the sum of the estimated maximum power consumption values in each of the time blocks falls within the power consumption limit value.

FIGS. 17A and 17B are second diagrams illustrating the schedule processing. Subsequently, the job allocation unit 14 arranges the unexecuted jobs Djd and Eje in order of priority (S17 in FIG. 10) and selects the job Djd given the highest priority as illustrated in FIG. 17A (YES in S18 and S19). The number of the used calculation nodes of the job Djd is 12, the estimated execution time thereof is one hour long, and the estimated maximum power consumption value thereof is 40 kW. Then, the job allocation unit 14 temporarily allocates the unexecuted job Djd to the time block between 11:00 a.m. and 12:00 p.m. to which the 12 calculation nodes may be allocated and that corresponds to the estimated execution time of the job Djd (S20). Next, the job allocation unit 14 adds the estimated maximum power consumption value 40 kW of the job Djd to the estimated maximum power consumption value 50 kW of the ongoing job Cjc allocated to the time block between 11:00 a.m. and 12:00 p.m. to calculate the sum of the estimated maximum power consumption values (90 kW=50 kW+40 kW) (S21). On this occasion, the sum of the estimated maximum power consumption values 90 kW in the time block 11:00 a.m. and 12:00 p.m. (in a resource map m23) exceeds the power consumption limit value 60 kW (NO in S22).

Therefore, the job allocation unit 14 repeatedly performs the processing for allocating the unexecuted job Djd (S20 to S22) and finally formally allocates the unexecuted job Djd to the time block between 16:00 p.m. and 17:00 p.m. to which the 12 calculation nodes of the unexecuted job Djd may be allocated and that corresponds to the estimated execution time of the job Djd (S23). On this occasion, the estimated maximum power consumption value 40 kW in the time block between 16:00 p.m. and 17:00 p.m. (in a resource map m24) falls within the power consumption limit value 80 kW as illustrated in FIG. 17B (YES in S22). Accordingly, the unexecuted job Djd is moved from the line of the submitted jobs to the line of the execution standby jobs.

FIGS. 18A and 18B are third diagrams illustrating the schedule processing. Next, the job allocation unit 14 selects the unexecuted job Eje as illustrated in FIG. 18A (YES in S18 and S19). The number of the used calculation nodes of the job Eje is 32, the estimated execution time thereof is six hours long, and the estimated maximum power consumption value thereof is 100 kW. Then, the job allocation unit 14 temporarily allocates the unexecuted job Eje to the time block between 17:00 p.m. and 18:00 p.m. to which the 32 calculation nodes may be allocated and that corresponds to the estimated execution time of the job Eje (S20). However, the estimated maximum power consumption value 100 kW in the time block between 17:00 p.m. and 18:00 p.m. exceeds the power consumption limit value 80 kW (NO in S22). Therefore, the job allocation unit 14 repeatedly performs the processing for allocating the unexecuted job Eje (S20 to S22) and finally formally allocates the unexecuted job Eje to the time block between 19:00 p.m. and 23:00 p.m. (S23). On this occasion, the estimated maximum power consumption value 100 kW in the time block between 19:00 p.m. and 23:00 p.m. (in a resource map m36) falls within the power consumption limit value 100 kW as illustrated in FIG. 18B (YES in S22). Accordingly, the unexecuted job Eje is moved from the line of the submitted jobs to the line of the execution standby jobs.

As described above with reference to FIGS. 15A and 15B to FIGS. 18A and 18B, the newly submitted unexecuted jobs Djd and Eje are scheduled. In addition, in any of the time blocks of the generated schedules, the sum of the estimated maximum power consumption values falls within the power consumption limit value. Note that although the embodiment describes the example in which the jobs are given the priority, it may not be limited to this example. The jobs may not be given the priority. For example, the job management node 10 successively schedules the jobs in order of the number of the used calculation nodes. In this case also, the job management node 10 schedules the jobs such that the sum of the estimated maximum power consumption values of the jobs in each of the time blocks falls within the power consumption limit value, thereby making it possible to flexibly schedule the jobs within the range of the power consumption limit value.

FIG. 19 is a diagram illustrating a power consumption limit value x32 and a power consumption value x31 in a case in which the job management processing according to the embodiment is performed. In FIG. 19, a vertical axis represents a power value, and a horizontal axis represents time. As illustrated in FIG. 19, for example, the difference between the record of the power consumption value x31 in a time block e3 in which the power consumption limit value x32 is reduced and the power consumption limit value x32 is reduced. In addition, it becomes possible to reduce the difference between the record of the power consumption value x31 and the power consumption limit value x32 in other time blocks.

For scheduling jobs, the job management node 10 according to the embodiment acquires the estimated maximum power consumption values of the jobs and schedules the jobs while fully determining whether the sum of the estimated maximum power consumption values of the jobs in each time block falls within the power consumption limit value x32. Thus, the job management node 10 is allowed to generate a schedule such that the sum of the power consumption values of the jobs does not exceed the power consumption limit value x32. That is, the job management node 10 is allowed to efficiently execute the jobs within a range in which the sum of the power consumption values of the jobs does not exceed the power consumption limit value x32.

As described above, the job management node 10 of the information processing system according to the embodiment includes a storage device configured to store a maximum power value when one or more calculation nodes has executed a first job, and a controller. The controller configured to detect the first job, at least one of which an identification information is matched with the identification information of a second job to be scheduled, of which the number of the calculation nodes to use is matched with the number of the calculation nodes of the second job, and of which a difference of the number of the calculation nodes with the second job is within a prescribed range. The controller predicts, as a second maximum power value of the second job, a first maximum power value of the detected first job stored in the storage device. And the controller schedules the second job such that the second maximum power value of the second job does not exceed a power consumption limit value set according to a time.

In the manner described above, the job management node 10 according to the embodiment is allowed to acquire the estimated maximum power consumption value of a job to be scheduled based on the record of the maximum power consumption value of an executed job having the number of used calculation nodes or job identification information same as that of the job to be scheduled or the number of used calculation nodes different from that of the job to be scheduled by a prescribed range. That is, for scheduling a job, the job management node 10 is allowed to estimate the maximum power consumption value of the job by using the number of used calculation nodes and the job identification information of the job. Further, by using the estimated maximum power consumption value of a job to be scheduled, the job management node 10 is allowed to schedule the job such that the sum of the maximum power consumption values of all the jobs in each time block falls within a power consumption limit value in advance.

Thus, the job management node 10 according to the embodiment is allowed to flexibly schedule a job according to a power consumption limit value set according to time of day. Therefore, the job management node 10 is allowed to efficiently execute a job executable within the range of a power consumption limit value. Moreover, the job management node 10 acquires, as the estimated maximum power consumption value of a job to be scheduled, the record of the maximum power consumption value of an executed job having the number of used calculation nodes same as that of the job to be scheduled or the number of used calculation nodes different from that of the job to be scheduled by a prescribed range. Thus, the job management node 10 is allowed to more accurately acquire the estimated maximum power consumption value of a job to be scheduled based on the number of used calculation nodes and the record of a power consumption value.

In addition, in the job management node 10 according to the embodiment, the controller further detects, as the first job, a job at least one of which the number of processes is matched with the number of processes of the second job, of which the predicted amount of input and output data is matched with the amount of input and output data of the second job, of which a difference of the number of processes with the second job is within a prescribed range, and of which the a difference of the predicted amount of input and output data with the second job is within a prescribed range, besides the number of the calculation nodes.

Thus, the job management node 10 is allowed to acquire the estimated maximum power consumption value of a job to be scheduled based on the record of the maximum power consumption value of an executed job having the number of processes and an estimated data I/O amount, any or both of which are the same as those of the job to be scheduled besides the number of used calculation nodes or the number of processes and an estimated data I/O amount, any or both of which are different from those of the job to be scheduled by a prescribed range besides the number of used calculation nodes. The power consumption value of a job varies with the number of processes, an estimated data I/O amount besides the number of used calculation nodes. Therefore, the job management node 10 is allowed to more accurately acquire the estimated maximum power consumption value of a job to be scheduled based on a plurality of information.

Moreover, in the job management node 10 according to the embodiment, the controller further detects, as the first job, a job of which the type is matched with the second job besides the identification information.

Thus, the job management node 10 is allowed to acquire the estimated maximum power consumption value of a job to be scheduled based on the record of the maximum power consumption value of an executed job having a job type same as that of the job to be scheduled besides job identification information of the job to be scheduled. Since the processing of a job to be scheduled having job identification information and a job type same as those of an executed job is similar to that of the executed job, it is assumed that the difference in the power consumption value between the job to be scheduled and the executed job is also small. Thus, the job management node 10 is allowed to more accurately acquire the estimated maximum power consumption value of a job to be scheduled based on a plurality of information.

As described above, the job management node 10 according to the embodiment acquires, as the estimated maximum power consumption value of a job to be scheduled, the maximum power consumption value of the calculation nodes 20 that have executed a job having job identification information same as that of the job to be scheduled or the number of used calculation nodes same as that of the job to be scheduled or the number of used calculation nodes different from that of the job to be scheduled by a prescribed range. Therefore, the estimated maximum power consumption value of a job to be scheduled may exceed a power consumption value (actually measured power consumption value) when the job is actually executed.

Therefore, the job management node 10 according to the embodiment, the controller further acquires a power value, which is measured, of a third job which is running by one or more the calculation nodes, and controls an operation state of the third job when the measured power value of the one or more third jobs exceeds the power limit value. Thus, the job management node 10 is allowed to make the maximum power consumption values of ongoing jobs fall within a power consumption limit value even in a case in which the estimated maximum power consumption value of a job exceeds an actually measured power consumption value, i.e., even in a case in which an error exists in the estimate of the maximum power consumption value of the job. In addition, the job management node 10 does not perform processing for coordinating the execution of ongoing jobs when the sum of the actually measured power consumption values of ongoing jobs does not exceed a threshold based on a power consumption limit value even in a case in which a power consumption value exceeding job exists. Thus, the job management node 10 is allowed to reduce the frequency of the processing for coordinating the execution of ongoing jobs.

In addition, the controller suspends for a prescribed period of time one of the third jobs of which the measured power value exceeds the predicted maximum power value, when the measured power value of the one or more third jobs exceeds the power limit value. The job management node 10 is allowed to reduce a power consumption value by temporarily suspending the processing of a power consumption value exceeding job having an error in the estimate of the maximum power consumption value thereof. Therefore, the job management node 10 is allowed to make the sum of the maximum power consumption values of ongoing jobs fall within a power consumption limit value even in a case in which an error exists in the estimate of the maximum power consumption value of a job.

Moreover, the controller stops the suspended job when the power value which is measured of the one or more third jobs exceeds the power limit value after suspending by the prescribed number of times the fourth job for the prescribed period of time. Thus, when the sum of the maximum power consumption values of jobs does not fall within a power consumption limit value even after temporarily suspending the processing of a power consumption value exceeding job by reference number of times, the job management node 10 is allowed to reliably reduce power consumption values by stopping the processing of the power consumption value exceeding job. Therefore, even in a case in which an error exists in the estimate of the maximum power consumption value of a job, the job management node 10 is allowed to make the sum of the maximum power consumption values of ongoing jobs fall within a power consumption limit value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a plurality of calculation nodes that execute jobs; and
a job management node that manages the jobs, wherein the job management node comprises:
a storage device configured to store a first maximum power value which has been consumed when one or more calculation nodes has executed a first job; and
a controller configured to detect the first job, which has been executed, whose identification information is matched with identification information of a second job to be scheduled, whose number of the calculation nodes to use is matched with a number of the calculation nodes of the second job, or whose difference of the number of the calculation nodes with the second job is within a prescribed range, predict, as a second maximum power value of the second job, the first maximum power value of the detected first job stored in the storage device, and schedule the second job such that the second maximum power value of the second job does not exceed a power consumption limit value set according to a time;
wherein the controller further detects, as the first job, a job whose type is matched with the second job besides the identification information.

2. The information processing system according to claim 1, wherein the controller further acquires a power value, which is measured, of a third job which is running by one or more the calculation nodes, and controls an operation state of the third job when the measured power value of the one or more third jobs exceeds the power limit value.

3. The information processing system according to claim 2, wherein the controller suspends for a prescribed period of time one of the third jobs of which the measured power value exceeds the predicted maximum power value, when the measured power value of the one or more third jobs exceeds the power limit value.

4. The information processing system according to claim 3, wherein the controller stops the suspended job when the power value which is measured of the one or more third jobs exceeds the power limit value after suspending by the prescribed number of times the fourth job for the prescribed period of time.

5. The information processing system according to claim 1, wherein the controller further detects, as the first job, a job whose number of processes is matched with the number of processes of the second job, whose predicted amount of input and output data is matched with the amount of input and output data of the second job, whose difference of the number of processes with the second job is within a prescribed range, or whose difference of the predicted amount of input and output data with the second job is within a prescribed range, besides the number of the calculation nodes.

6. The information processing system according to claim 1, wherein the controller preferentially schedules the second job given higher priority among the plurality of second jobs in a most recent time band that satisfies execution time, which is estimated, of the second job.

7. A job management apparatus that manages job executed by one or more calculation nodes, the job management apparatus comprising:
a storage device configured to store a first maximum power value which has been consumed when one or more calculation nodes has executed a first job; and
a controller configured to detect the first job, which has been executed, whose identification information is matched with identification information of a second job to be scheduled, whose number of the calculation nodes to use is matched with a number of the calculation nodes of the second job, or whose difference of the number of the calculation nodes with the second job is within a prescribed range, predict, as a second maximum power value of the second job, the first maximum power value of the detected first job stored in the storage device, and schedule the second job such that the second maximum power value of the second job does not exceed a power consumption limit value set according to a time; and
wherein the controller further detects, as the first job, a job whose type is matched with the second job besides the identification information.

8. The job management apparatus according to claim 7, wherein the controller further acquires a power value, which is measured, of a third job which is running by one or more the calculation nodes, and controls an operation state of the third job when the measured power value of the one or more third jobs exceeds the power limit value.

9. The job management apparatus according to claim 8, wherein the controller suspends for a prescribed period of time one of the third jobs of which the measured power value exceeds the predicted maximum power value, when the measured power value of the one or more third jobs exceeds the power limit value.

10. The job management apparatus according to claim 7, wherein the controller further detects, as the first job, a job whose number of processes is matched with the number of processes of the second job, whose predicted amount of input and output data is matched with the amount of input and output data of the second job, whose difference of the number of processes with the second job is within a prescribed range, or whose difference of the predicted amount of input and output data with the second job is within a prescribed range, besides the number of the calculation nodes.

11. A non-transitory computer-readable recording medium having stored therein a program for causing a computer to execute controlling process for a job management apparatus that manages jobs executed by one or more calculation nodes, the controlling process comprising:
detecting the first job which has been executed, whose identification information is matched with an identification information of a second job to be scheduled, whose number of the calculation nodes to use is matched with a number of the calculation nodes of the second job, or whose difference of the number of the calculation nodes with the second job is within a prescribed range;
predicting, as a second maximum power value of the second job, a first maximum power value which has been consumed when one or more calculation nodes has executed the detected first job; and
scheduling the second job such that the second maximum power value of the second job does not exceed a power consumption limit value set according to a time;
wherein the detecting further comprising second detecting, as the first job, a job whose type is matched with the second job besides the identification information.

12. The non-transitory computer-readable recording medium having stored therein the program according to claim 11, wherein the controlling process further comprising:
acquiring a power value, which is measured, of a third job which is running by one or more the calculation nodes; and
controlling an operation state of the third job when the measured power value of the one or more third jobs exceeds the power limit value.

13. The non-transitory computer-readable recording medium having stored therein the program according to claim 11, wherein the detecting further comprising:

first detecting, as the first job, a job whose number of processes is matched with the number of processes of the second job, whose predicted amount of input and output data is matched with the amount of input and output data of the second job, whose difference of the number of processes with the second job is within a prescribed range, or whose difference of the predicted amount of input and output data with the second job is within a prescribed range, besides the number of the calculation nodes.

14. A method of controlling an information processing system comprising a plurality of calculation nodes that executes jobs and a job management node that manages the jobs, the method comprising:

detecting the first job which has been executed, whose identification information is matched with an identification information of a second job to be scheduled, of which the whose number of the calculation nodes to use is matched with a number of the calculation nodes of the second job, or whose difference of the number of the calculation nodes with the second job is within a prescribed range;

predicting, as a second maximum power value of the second job, a first maximum power value which has been consumed when one or more calculation nodes has executed the detected first job; and scheduling the second job such that the second maximum power value of the second job does not exceed a power consumption limit value set according to a time;

wherein the detecting further comprising second detecting, as the first job, whose type is matched with the second job besides the identification information.

15. The method according to claim 14, wherein the method further comprising:

acquiring a power value, which is measured, of a third job which is running by one or more the calculation nodes; and controlling an operation state of the third job when the measured power value of the one or more third jobs exceeds the power limit value.

16. The method according to claim 14, wherein the detecting further comprising first detecting, as the first job, a job whose number of processes is matched with the number of processes of the second job, whose predicted amount of input and output data is matched with the amount of input and output data of the second job, whose difference of the number of processes with the second job is within a prescribed range, or whose difference of the predicted amount of input and output data with the second job is within a prescribed range, besides the number of the calculation nodes.

* * * * *